US012459146B2

(12) United States Patent
Hori

(10) Patent No.: US 12,459,146 B2
(45) Date of Patent: Nov. 4, 2025

(54) CUTTING DEVICE, CUTTING METHOD, AND STORAGE MEDIUM

(71) Applicant: CASIO COMPUTER CO., LTD., Tokyo (JP)

(72) Inventor: Masahiro Hori, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 203 days.

(21) Appl. No.: 18/389,224

(22) Filed: Nov. 14, 2023

(65) Prior Publication Data

US 2024/0181666 A1 Jun. 6, 2024

(30) Foreign Application Priority Data

Dec. 2, 2022 (JP) ................................ 2022-193184

(51) Int. Cl.
*B26D 5/00* (2006.01)
*A45D 29/00* (2006.01)
*B26D 1/04* (2006.01)

(52) U.S. Cl.
CPC .......... *B26D 5/007* (2013.01); *A45D 29/004* (2013.01); *B26D 1/045* (2013.01)

(58) Field of Classification Search
CPC ....... B26D 1/045; B26D 5/007; A45D 29/004
See application file for complete search history.

(56) References Cited

U.S. PATENT DOCUMENTS 2,793,694 A * 5/1957 Vogt .................. B65H 35/0026 225/21
5,258,917 A * 11/1993 Bruder ...................... C14B 5/00 702/167
5,815,398 A * 9/1998 Dighe ................. G06Q 10/043 700/171
5,831,857 A * 11/1998 Clarino ................ G06Q 10/043 700/134
5,873,375 A * 2/1999 Johnson ............... A45D 29/004 132/285
10,579,049 B2 * 3/2020 Safai ................ G05B 19/41815
(Continued)

FOREIGN PATENT DOCUMENTS

JP H09300841 A 11/1997
JP 2001314226 A 11/2001
(Continued)

OTHER PUBLICATIONS

Japanese Office Action (and an English translation thereof) dated Apr. 8, 2025, issued in counterpart Japanese Application No. 2022-193184.
(Continued)

*Primary Examiner* — Sean M Michalski
(74) *Attorney, Agent, or Firm* — Holtz, Holtz & Volek PC

(57) ABSTRACT

A cutting device including: a cutting blade; a tape setting stage on which a tape member is to be mounted; and at least one processor. In producing a masking tape by cutting out a pattern selected by a user from the tape member mounted on the tape setting stage with the cutting blade, the at least one processor detects a region of a nail based on an image of a fingertip acquired with a camera, and adjusts a position at which the pattern is to be cut out such that the pattern is located within a region to be applied to the region of the nail having been detected.

15 Claims, 12 Drawing Sheets

(56) References Cited

U.S. PATENT DOCUMENTS

| | | | | |
|---|---|---|---|---|
| 10,703,088 | B2 * | 7/2020 | DuBois, III | B41C 1/12 |
| 2012/0308289 | A1 * | 12/2012 | Kosuge | B41J 11/009<br>400/621 |
| 2019/0021467 | A1 * | 1/2019 | Sato | B41J 3/407 |
| 2019/0210370 | A1 * | 7/2019 | Nagao | B41J 2/16544 |
| 2024/0181666 | A1 * | 6/2024 | Hori | B26D 1/045 |

FOREIGN PATENT DOCUMENTS

| | | | |
|---|---|---|---|
| JP | 2011131339 | A | 7/2011 |
| JP | 2016171968 | A | 9/2016 |
| JP | 2017213267 | A | 12/2017 |
| JP | 2019053626 | A | 4/2019 |
| JP | 2022062925 | A | 4/2022 |

OTHER PUBLICATIONS

Japanese Office Action dated Jan. 14, 2025 (and English translation thereof), issued in counterpart Japanese Application No. 2022-193184.

* cited by examiner

CUTTING DEVICE, CUTTING METHOD, AND STORAGE MEDIUM

CROSS-REFERENCE TO RELATED APPLICATIONS

This application is based upon and claims the benefit of priority under 35 USC 119 of Japanese Patent Application No. 2022-193184, filed on Dec. 2, 2022, the entire disclosure of which, including the description, claims, drawings, and abstract, is incorporated herein by reference in its entirety.

TECHNICAL FIELD

The present disclosure relates to a cutting device, a cutting method, and a storage medium.

DESCRIPTION OF RELATED ART

When applying a nail polish to nails, it is conventionally difficult for a user to paint only a portion to be painted with the nail polish such that the nail polish is not located out of the portion.

In this respect, JP 2017-213267 A describes applying masking by attaching a masking tape to a place other than a portion to be painted, thereby preventing a nail polish from adhering to an unnecessary place.

SUMMARY OF THE INVENTION

A cutting device according to an aspect of the present disclosure includes:

a cutting blade;

a tape setting stage on which a tape member is to be mounted; and at least one processor, wherein in producing a masking tape by cutting out a pattern selected by a user from the tape member mounted on the tape setting stage with the cutting blade, the at least one processor detects a region of a nail based on an image of a fingertip acquired with a camera, and adjusts a position at which the pattern is to be cut out such that the pattern is located within a region to be applied to the region of the nail having been detected.

A cutting method according to an aspect of the present disclosure is a cutting method to be executed by a computer of a cutting device, the method including:

producing that is producing a masking tape by cutting out a pattern selected by a user from a tape member mounted on a tape setting stage with a cutting blade, wherein the producing includes detecting that is detecting a region of a nail based on an image of a fingertip acquired with a camera, and adjusting that is adjusting a position at which the pattern is to be cut out such that the pattern is located within a region to be applied to the region of the nail having been detected in the detecting.

A storage medium according to an aspect of the present disclosure is A non-transitory storage medium having stored thereon a program readable by a computer of a cutting device that includes a cutting blade and a tape setting stage on which a tape member is to be mounted, the program causing the computer to execute producing that is producing a masking tape by cutting out a pattern selected by a user from the tape member mounted on the tape setting stage with the cutting blade, wherein the producing includes detecting that is detecting a region of a nail based on an image of a fingertip acquired with a camera, and adjusting that is adjusting a position at which the pattern is to be cut out such that the pattern is located within a region to be applied to the region of the nail having been detected in the detecting.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Embodiments of a cutting device, a program, and a cutting method according to the present disclosure will be described with reference to the drawings.

The cutting device according to each of the embodiments is to perform a cutting operation such as cutting off or cutting out on a base tape Sa which is a tape member S before processing, thereby producing a masking tape Sc. The produced masking tape Sc is to apply masking to a portion to which a user does not want to let a nail polish adhere when performing treatment of painting a nail T with the nail polish. When the user performs treatment of attaching the masking tape Sc to a finger U and painting the nail T with the nail polish, nail art is easily applied to the nail T.

Various limitations which are technically preferable for implementing the present invention are imposed on embodiments which will be described below, however, the scope of the present invention is not limited to the following embodiments and illustrated examples.

First Embodiment

A first embodiment of a cutting device, a program, and a cutting method according to the present disclosure will be described first with reference to FIG. 1 to FIG. 13C.

Configuration of Cutting Device

Figure 1:
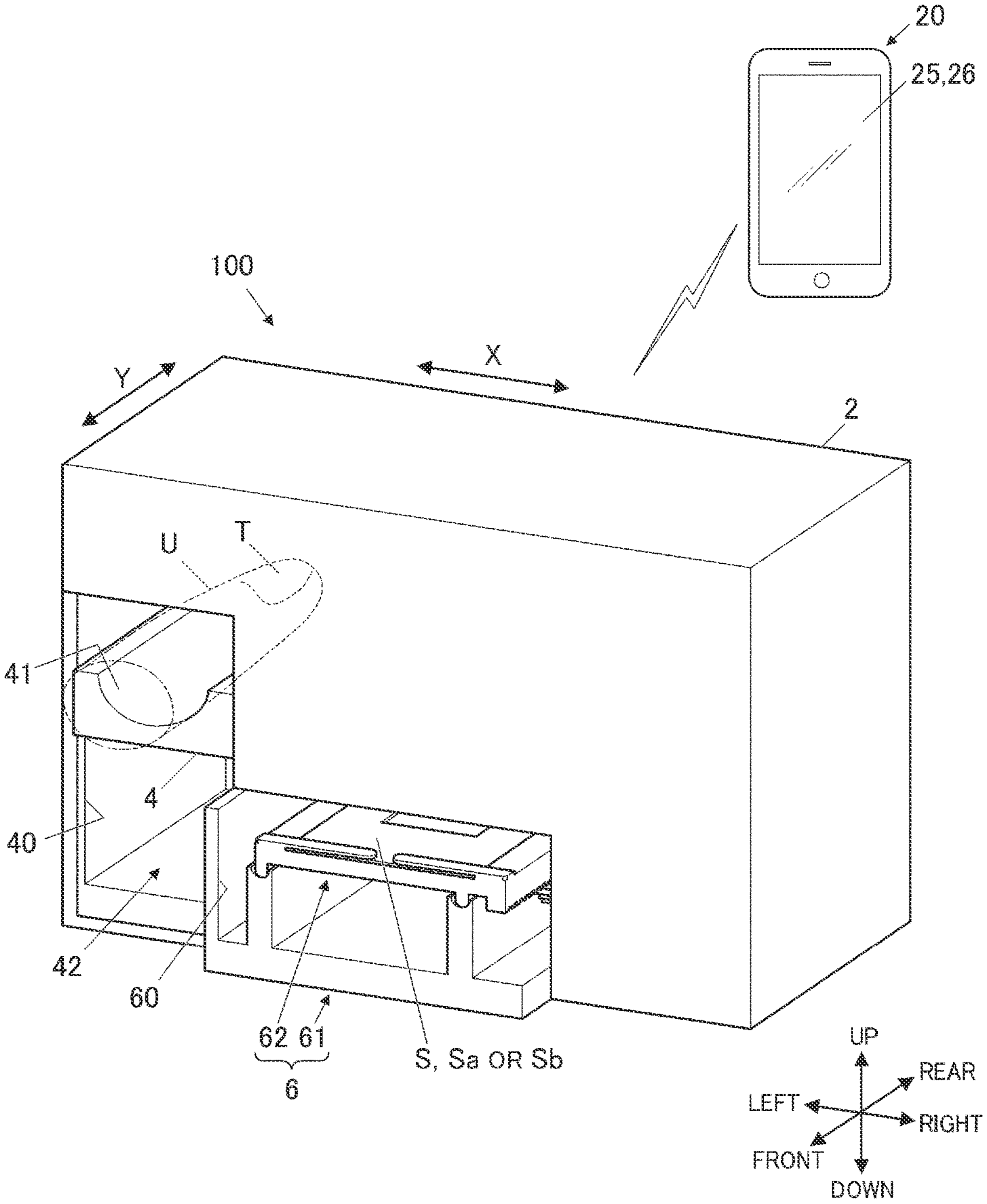
FIG. 1 is a main part perspective view showing an external configuration of a cutting device according to a first embodiment.

FIG. 1 is a main part perspective view showing an external configuration of the cutting device according to the present embodiment.

As shown in FIG. 1, a cutting device 100 of the present embodiment has an enclosure 2 formed into a substantially box-like shape. In the following embodiments, up and down, front and rear, and right and left in the cutting device 100 shall refer to orientations shown in FIG. 1 and the like. The X-direction and the Y-direction in the cutting device 100 shall refer to directions shown in FIG. 1 and the like. The shape and the like of the cutting device 100 are not limited to those of the illustrated example.

Figure 2:
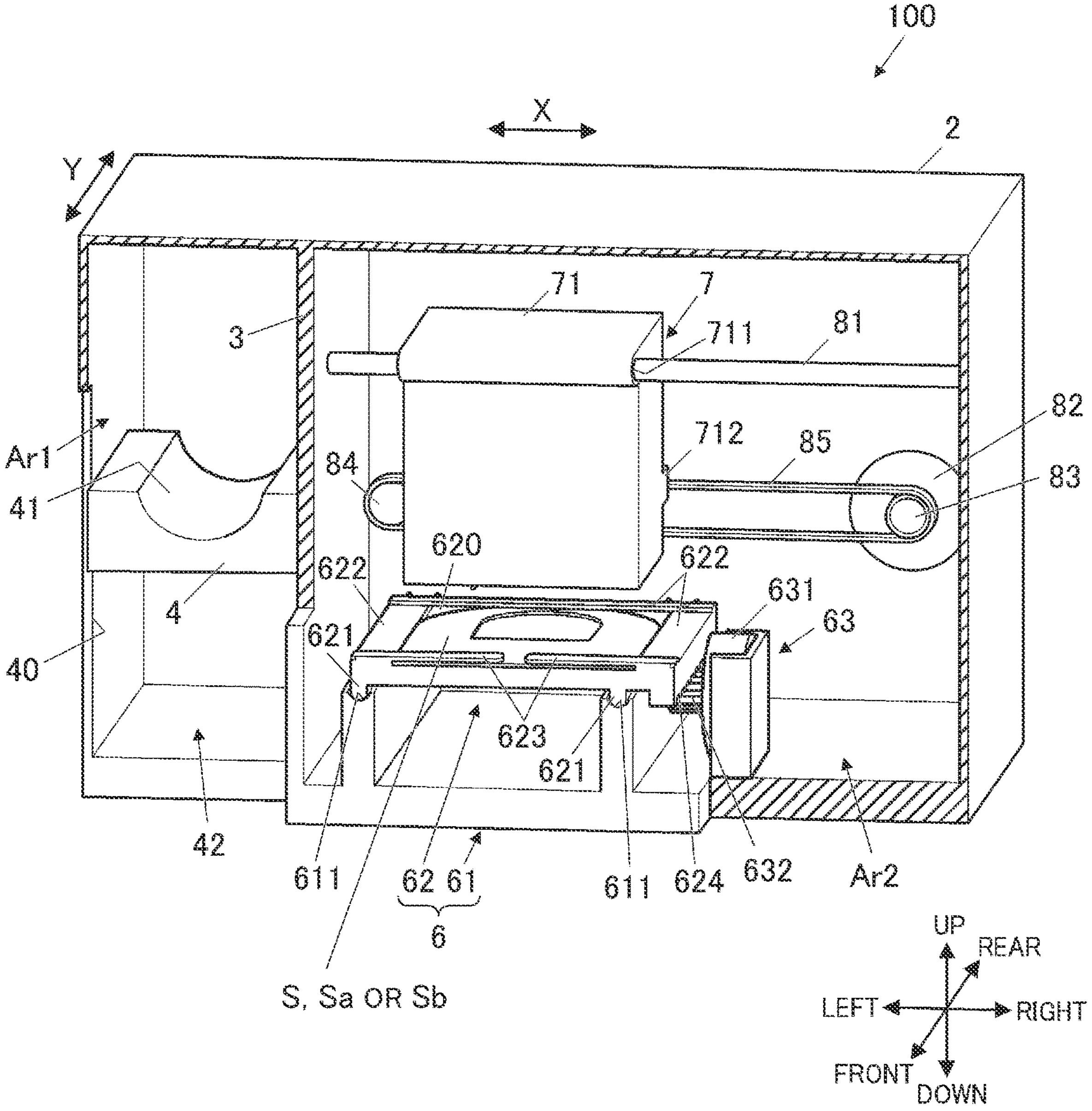
FIG. 2 is a main part perspective view showing an internal configuration with a front surface side of the cutting device shown in FIG. 1 cut away.
Figure 3:
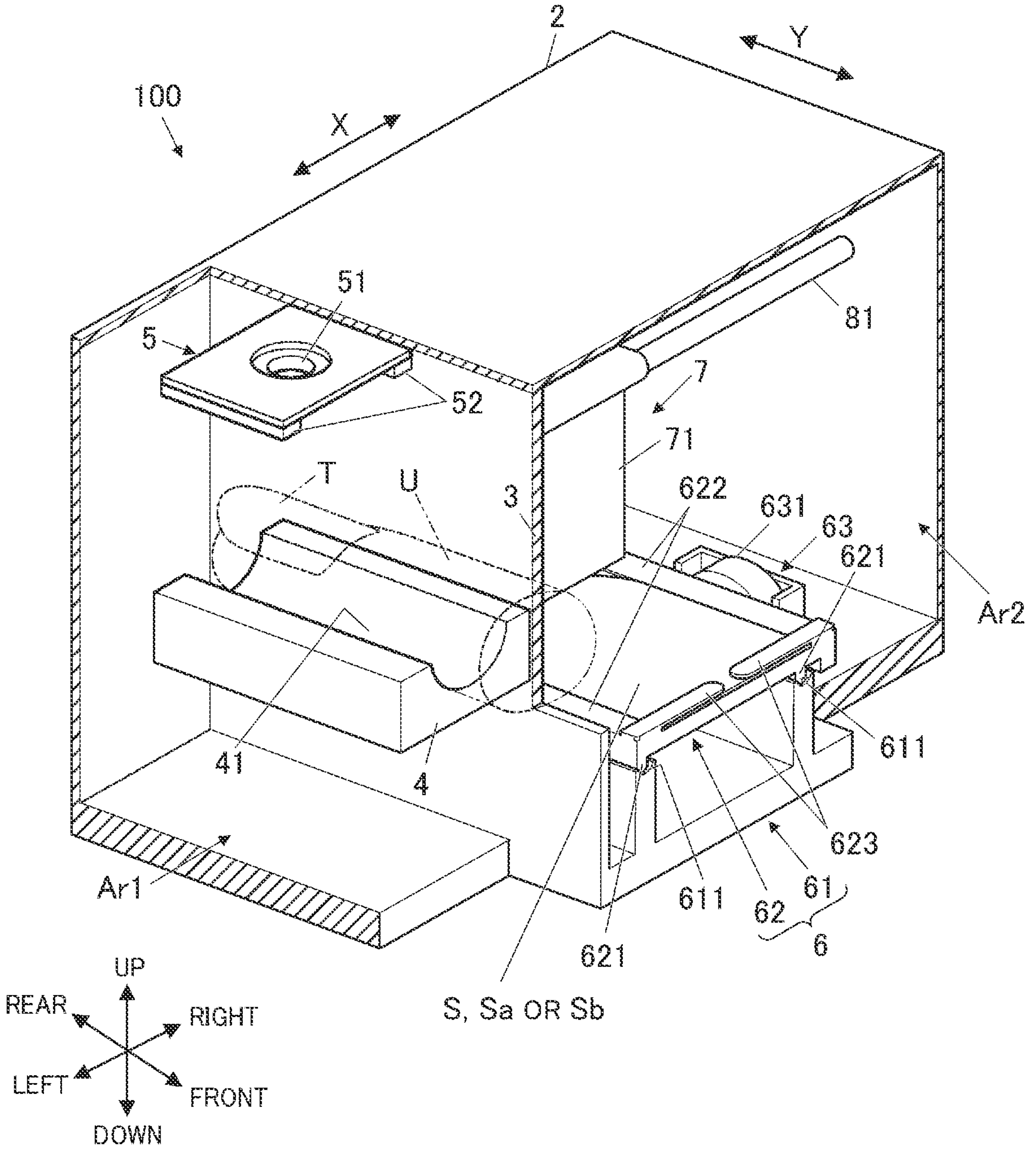
FIG. 3 is a main part perspective view showing the internal configuration with the front surface side and a left side of the cutting device shown in FIG. 1 cut away.

FIG. 2 is a main part perspective view showing an internal main part configuration of the cutting device with a front surface portion of the enclosure in FIG. 1 partially cut away. FIG. 3 is a main part perspective view of the inside of the cutting device as seen from the diagonally forward left also with a left side surface of the enclosure in the state shown in FIG. 2 cut away.

As shown in FIG. 2 and FIG. 3, the cutting device 100 of the present embodiment has a partition 3 that divides a space in the enclosure 2 into two right and left spaces.

In FIG. 1 to FIG. 3, the space on the left side of the cutting device 100 (the left side relative to the partition 3 in FIG. 2 and FIG. 3) serves as a first space Ar1 in which the finger U is to be arranged. A finger stage 4 is provided slightly above the center in the up-down direction of the first space Ar1 so as to section the first space Ar1 into upper and lower spaces.

A portion corresponding to the first space Ar1 on the front surface side of the enclosure 2 (the front side of the device in FIG. 1 and the like) is opened (as an opening 40 in FIG. 1 and the like) from slightly above the position corresponding to the finger stage 4 toward the lower end. The degree to which the opening 40 is opened upward from the finger stage 4 is set as appropriate, and the opening 40 is opened to such a height that allows at least one finger arranged on the finger stage 4 to be inserted/withdrawn into/from the device without any problem.

The finger stage 4 is a stage on which the finger U inserted from the opened front surface side (that is, the opening 40) of the cutting device 100 is to be arranged. The finger stage 4 receives the pad side of the finger U inserted into the enclosure 2. In the present embodiment, the finger U is individually arranged on the finger stage 4.

Although a specific configuration of the finger stage 4 is not particularly limited, it is preferable that a recess 41 be provided in a direction in which the finger U is inserted as illustrated in FIG. 1 to FIG. 3. A camera 51 of an image capturing unit 5 is arranged above the finger stage 4 as will be described later. Arranging the pad side of the finger U in the recess 41 prevents the finger U held on the finger stage 4 from axially rotating. This stabilizes the position and orientation of the finger U and facilitates maintaining a state in which the surface of the nail T is directed to the camera 51, which will be described later, positioned above the finger stage 4. It is preferable that a cushion member or the like not shown formed of a flexible resin, for example, be provided on an upper surface of the finger stage 4. By providing the cushion member or the like, the user is unlikely to feel a burden on the finger U when held on the finger stage 4.

As described earlier, the image capturing unit 5 is provided at a position corresponding to a place above the finger U including the nail T when the finger U is arranged on the finger stage 4. The image capturing unit 5 captures an image of the nail T (the finger U including the nail T) to acquire a finger image (an image of the finger U including the nail T).

The image capturing unit 5 includes the camera 51 which is a compact image capturer including a solid state image sensor of a charge coupled device (CCD) type, a complementary metal oxide semiconductor (CMOS) type, or the like, a lens, and the like, for example, as well as a light source 52 implemented by a white LED or the like that illuminates a target of image capturing. In the image capturing unit 5, the light source 52 is turned on, and an image of the finger U including the nail T arranged on the finger stage 4 is captured with the camera 51 while illuminating the finger U to obtain a finger image. The finger image of the finger captured with the camera 51 which is the image capturer is sent to a control device 10 which will be described later and acquired by the controller 11.

The space below the finger stage 4 in the first space Ar1 serves as a rest 42 that rests the fingers U (untargeted fingers not shown) different from the finger U arranged on the finger stage 4. In a case where the index finger, for example, is arranged on the finger stage 4, the thumb, middle finger, ring finger, and little finger of the hand on the same side are rested in the rest 42 as untargeted fingers. In a case where there is such a finger U (such as the thumb, for example) that if forced to be rested in the rest 42, the posture of the finger U arranged on the finger stage 4 becomes less stable, the untargeted finger may be arranged outside the rest 42 (outside the enclosure 2).

The space on the right side of the cutting device 100 in FIG. 1 to FIG. 3 (the right side relative to the partition 3 in FIG. 2 and FIG. 3) serves as a second space Ar2 for producing the masking tape Sc from the base tape Sa by performing a predetermined cutting operation. A tape stage 6 on which the tape member S is to be arranged is provided on a bottom surface of the second space Ar2.

A position at which the tape stage 6 is provided in the enclosure 2 and a portion above the position constitute an opening 60 opened to the front surface side of the device. The width and height of the opening 60 are not particularly limited. The opening 60 is opened to such a size that there is no problem at least when arranging the tape member S on the tape stage 6 or pulling out the arranged tape member S.

The tape member S is a target of cutting by the cutting device 100 in the present embodiment.

The color, material, and the like of the tape member S are not particularly limited, but it is preferable that the tape member S be formed of a transparent or semi-transparent material such that the position of the nail T is visible from above the tape when attaching the tape member S (the masking tape Sc) to the finger U.

The tape member S not having been subjected to cutting processing (cutting) will be referred to as the "base tape Sa". What is cut off from the base tape Sa in conformance to the shape of the finger U of the user will be referred to as the "mask base Sb". The tape member S obtained by subjecting the base tape Sa or the mask base Sb to cutting out in accordance with a pattern or the like to form a cutout C1 or C2 will be referred to as the "masking tape Sc". A rectangular tape (which will be referred to as a "first base tape Sa1"; see FIG. 5A) and a tape having a shape with some corners or the like cut off (which will be referred to as a "second base tape Sa2"; see FIG. 5B)" are included in the "base tape Sa" as will be described later. The "base tape Sa" as simply referred to shall include the "first base tape Sa1" and the "second base tape Sa2".

The "tape member S" as simply referred to in the following embodiments shall include all of the "base tape Sa", the "mask base Sb", and the "masking tape Sc".

The tape stage 6 includes a base 61 fixed to the bottom surface of the enclosure 2 and a tape setting stage 62 mounted on the base 61. Guides 611 that guide the tape setting stage 62 in the Y-direction (the front-rear direction or the depth direction of the device) are provided both on the right and left sides of the base 61 (right and left sides in FIG. 1 to FIG. 3). Guide rails 621 are provided in the Y-direction on the back surface side (lower surface side) of the tape setting stage 62 at positions corresponding to the guides 611 when mounted on the base 61. In the present embodiment, grooves are formed as the guides 611 in the base 61, and the guide rails 621 provided on the lower surface side of the tape setting stage 62 have a protruding shape to be fitted into the guides 611 which are grooves. The shapes, configuration, and the like of the guides 611 and the guide rails 621 are not limited to those in the example shown here. For example, guide rails having a protruding shape may be provided to the base 61, and guides having a shape to be fitted into the guide rails may be provided to the tape setting stage 62.

A drive 63 for moving the tape setting stage 62 in the Y-direction (the front-rear direction of the device) is provided on a lateral side of the tape stage 6 (in the present embodiment, the right side of the tape stage 6 in FIG. 2 or FIG. 3).

The drive 63 includes a stage moving motor 631 and a pinion gear 632 coaxial with the stage moving motor 631. A rack gear 624 is provided on the back surface side (lower surface side) of the tape setting stage 62 substantially in parallel to the guide rails 621. The rack gear 624 is to mesh with the pinion gear 632 of the stage moving motor 631 in a state where the tape setting stage 62 is mounted on the base 61. When the stage moving motor 631 is driven, the tape setting stage 62 on which the rack gear 624 is provided is moved in the Y-direction (the front-rear direction of the device) in accordance with rotation of the pinion gear 632.

Figure 4:
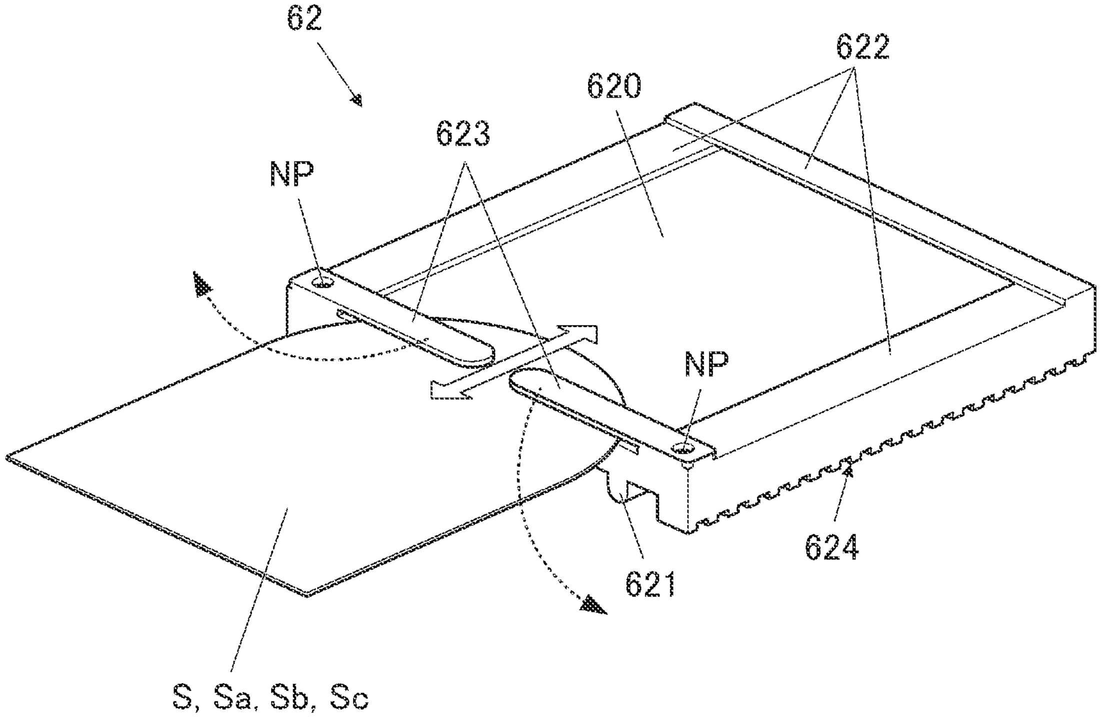
FIG. 4 is a main part perspective view showing an example of a tape setting stage.

FIG. 4 is a perspective view of the tape setting stage in the present embodiment.

As shown in FIG. 4, a surface of the tape setting stage 62 (an upper side surface in FIG. 4 and the like) serves as an arrangement surface 620 on which the tape member S is to be arranged. In the present embodiment, the size (such as vertical and horizontal lengths and thickness) of the tape member S to be cut with the cutting device 100 is defined, and edges 622 having a slight height are provided on both lateral sides and a farther side of the arrangement surface 620. When arranged substantially at the center of the arrangement surface 620, the tape member S (at least the "base tape Sa" before cutting processing) is positioned with both the right and left sides and the farther side thereof abutting against the edges 622.

As will be described later, in the present embodiment, the types (such as sizes "L" to "S", for example) of the tape members S that can be set on the tape setting stage 62 as a target of cutting are stored (registered) in advance in a memory 12 (see FIG. 8) or the like. The user is able to select the tape member S to be set on the tape setting stage 62 from a list registered in advance. The user then sets the selected tape member S on the tape setting stage 62.

It is preferable that the tape setting stage 62 be provided with a mark indicating a guide of a position at which the tape member S is to be arranged in accordance with the type (size). In this case, the tape member S is positioned by, for example, aligning the tape member S in a state where the left side end of the tape member S, for example, is pressed against the left side edge 622 such that the right side end of the tape member S is located at an "L mark position" in the case of the "L" size and the right side end of the tape member S is located at an "S mark position" in the case of the "S" size.

Figure 5A:
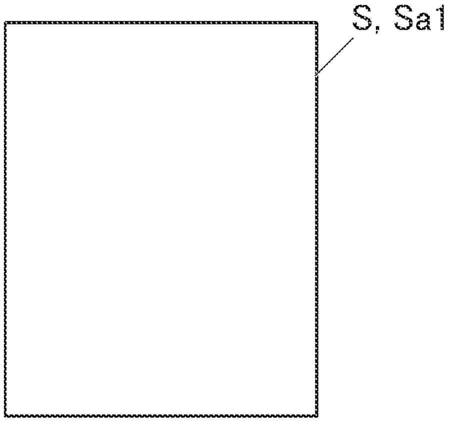
FIG. 5A is a plan view showing an example of a base tape.
Figure 5B:
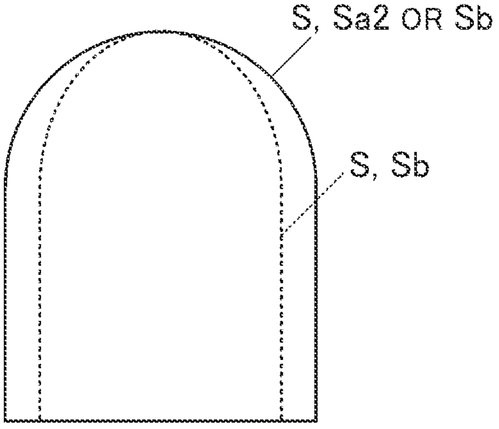
FIG. 5B is a plan view showing an example of the base tape or a mask base.

The outer shape of the tape member S (for example, the "base tape Sa" before cutting processing) arranged on the arrangement surface 620 may be a rectangular tape (the "first base tape Sa1") as shown in FIG. 5A, for example, or may be a tape (the "second base tape Sa2") in a state cut in advance into an outer shape that is easy to attach to the finger U (cut such that corners of a fingertip portion are cut off, for example) as shown in FIG. 5B. As described earlier, it is preferable that a plurality of tapes which are in the state of the "base tape Sa" before cutting processing and are different in dimension in the width direction in correspondence to the thickness of the finger or the like (such as the base tape Sa of the L size for thick fingers and the base tape Sa of the S size for thin fingers, for example) be prepared.

Catch arms 623 respectively screwed to both the right and left ends of the arrangement surface 620 are provided around the front on the surface of the tape setting stage 62. The catch arms 623 are pivotable around screwed portions NP to become open to right and left as indicated by dashed arrows in FIG. 4. When setting the tape member S on the arrangement surface 620 of the tape setting stage 62, the catch arms 623 are opened as appropriate to bring about a state in which the front of the tape setting stage 62 is open wide, thus enabling the tape member S to be set easily. Upon arranging the tape member S correctly at a position not to run on the edges 622, the catch arms 623 are caused to pivot to positions overlapping the front of the tape member S as shown in FIG. 4.

This enables the tape member S to be caught on the arrangement surface 620 so as not to be displaced during the cutting operation. A non-slip sheet or the like may be attached to surfaces of the catch arms 623 to be brought into contact with the tape member S. This prevents displacement and the like of the tape member S more reliably.

A cutting plotter unit 7 is provided above the tape stage 6 in the second space Ar2. In the present embodiment, the cutting plotter unit 7 is a cutter that performs a cutting operation on the base tape Sa (or the mask base Sb) based on information (information concerning a region of a nail) acquired based on an image of the finger U (a finger image which is an image of the finger U including the nail T) captured with the camera 51 which is an image capturer, thereby producing the masking tape Sc.

Figure 6:
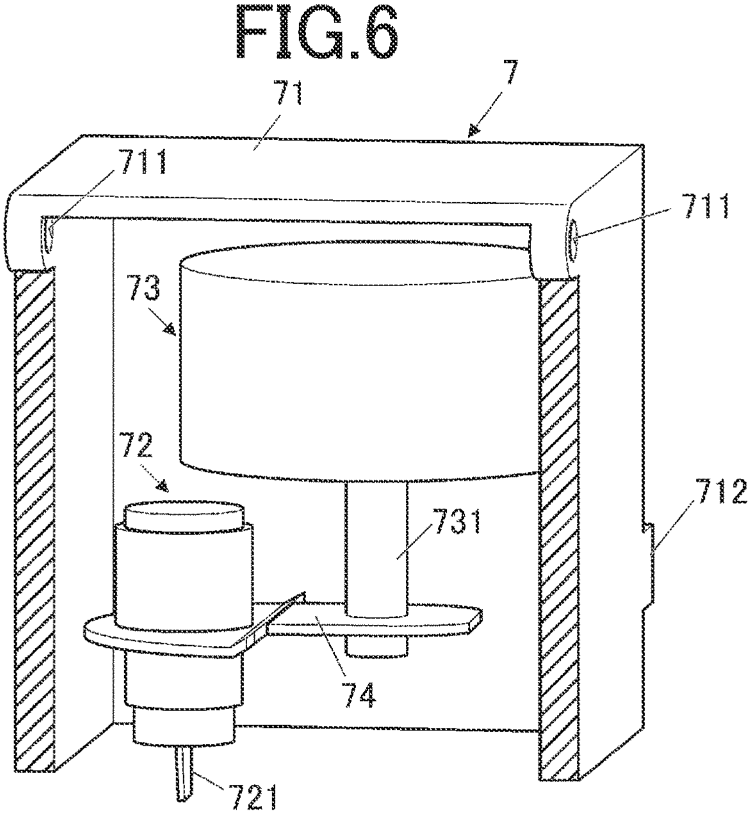
FIG. 6 is a main part perspective view showing an internal configuration with a front surface side of a cutting plotter unit cut away.
Figure 7:
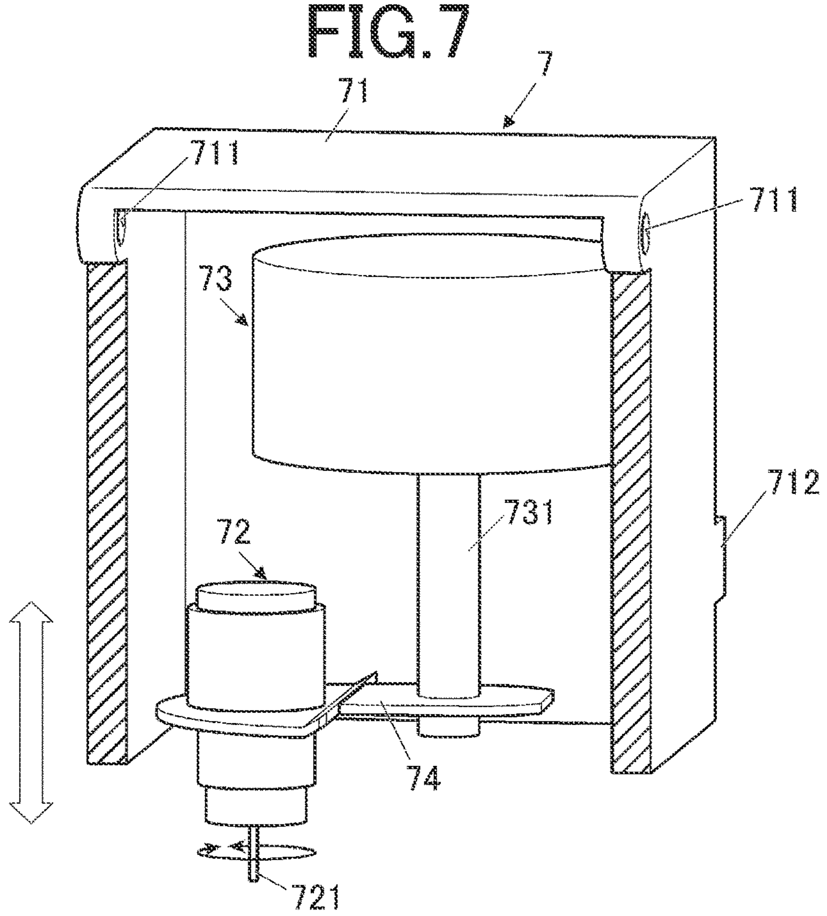
FIG. 7 is a main part perspective view showing the internal configuration with the front surface side of the cutting plotter unit cut away.

FIG. 6 and FIG. 7 are main part perspective views of a cutting plotter unit portion.

As shown in FIG. 2, FIG. 3, FIG. 6, and FIG. 7, the cutting plotter unit 7 includes a carriage 71 formed into a substantially box-like shape, and a cutter body 72 and a vertical mover 73 housed in the carriage 71. FIG. 6 and FIG. 7 show an internal configuration with a front surface side of the carriage 71 cut away.

A through-hole 711 extending through in the X-direction (the X-direction or a device width direction in FIG. 1 to FIG. 3) is formed on the front surface side of an upper part of the carriage 71. A shaft 81 is provided in the second space Ar2 and is inserted through the through-hole 711 of the carriage 71.

The shaft 81 is provided in the X-direction (the device width direction) and has opposite ends fixed to a wall surface of the enclosure and the partition 3, respectively (see FIG. 2).

The through-hole 711 has an inner circumferential surface serving as a bearing that receives the shaft 81, and a sliding bearing structure is provided in which the shaft 81 which is the shaft and the inner circumferential surface of the through-hole 711 which is the bearing are in direct contact. The carriage 71 is thereby supported by the shaft 81 and movable along the shaft 81.

A drive motor 82 is further arranged on one end side (the right side in the illustrated example) in the X-direction (the device width direction) on a surface on the farther side of the device in the second space Ar2. A driven pulley 84 driven by a pulley 83 (a drive pulley) coaxial with the drive motor 82 is provided on the other end side (the left side in the illustrated example) in the X-direction (the device width direction). A timing belt 85 is wound between the pulley 83 and the driven pulley 84. When the drive motor 82 drives the pulley 83 to rotate, the driven pulley 84 and the timing belt 85 are rotated together.

A belt coupler 712 is provided at a position in contact with the timing belt 85 on the rear surface of the carriage 71. Since the belt coupler 712 is coupled to the timing belt 85, the carriage 71 is moved in the X-direction (the device width direction) along the shaft 81 to coincide with the movement of the timing belt 85. The drive motor 82 is rotatable forward and backward. The carriage 71 is movable both in the right and left directions in the X-direction (the device width direction) in accordance with the operation of the drive motor 82.

As shown in FIG. 6 and FIG. 7, the cutter body 72 housed in the carriage 71 is coupled to the vertical mover 73 via a fixed plate spring 74.

The vertical mover 73 is to operate the cutter body 72 in the up-down direction, and is implemented by a solenoid or the like including a drive component 731 that operates in the up-down direction, for example. The fixed plate spring 74 has one end fixed to the drive component 731, and the cutter body 72 is fixed to the other end of the fixed plate spring 74. Thus, when the drive component 731 moves up/down, the cutter body 72 is moved in the up-down direction following this up/down movement.

A cutting blade 721 is put to a lower end of the cutter body 72. The cutting blade 721 is held to be pivotable around an axis as indicated by an arrow in FIG. 7. When abutting against a surface of a target (that is, the tape member S in the present embodiment), the cutting blade 721 is capable of freely changing the orientation of a blade edge in accordance with the direction of compression or movement. This enables the target (the tape member S) to be cut appropriately in a direction that the user wants to cut. Since the cutter body 72 is fixed via the fixed plate spring 74, a load is adjusted to be constant by a spring pressure of the fixed plate spring 74 when the drive component 731 moves down to cause the cutting blade 721 to abut against the surface of the target (the tape member S), and the cutting blade 721 cuts the target (the tape member S) in a state where an appropriate load is imposed.

As described above, in the present embodiment, the cutting plotter unit 7 is moved in the X-direction (the device width direction) and the tape setting stage 62 that holds the tape member S which is a target on its surface (the arrangement surface 620) is moved in the Y-direction (the device front-rear direction) as described earlier. This enables the cutting blade 721 to cut the target (the tape member S) while moving on the XY-plane as appropriate.

Figure 8:
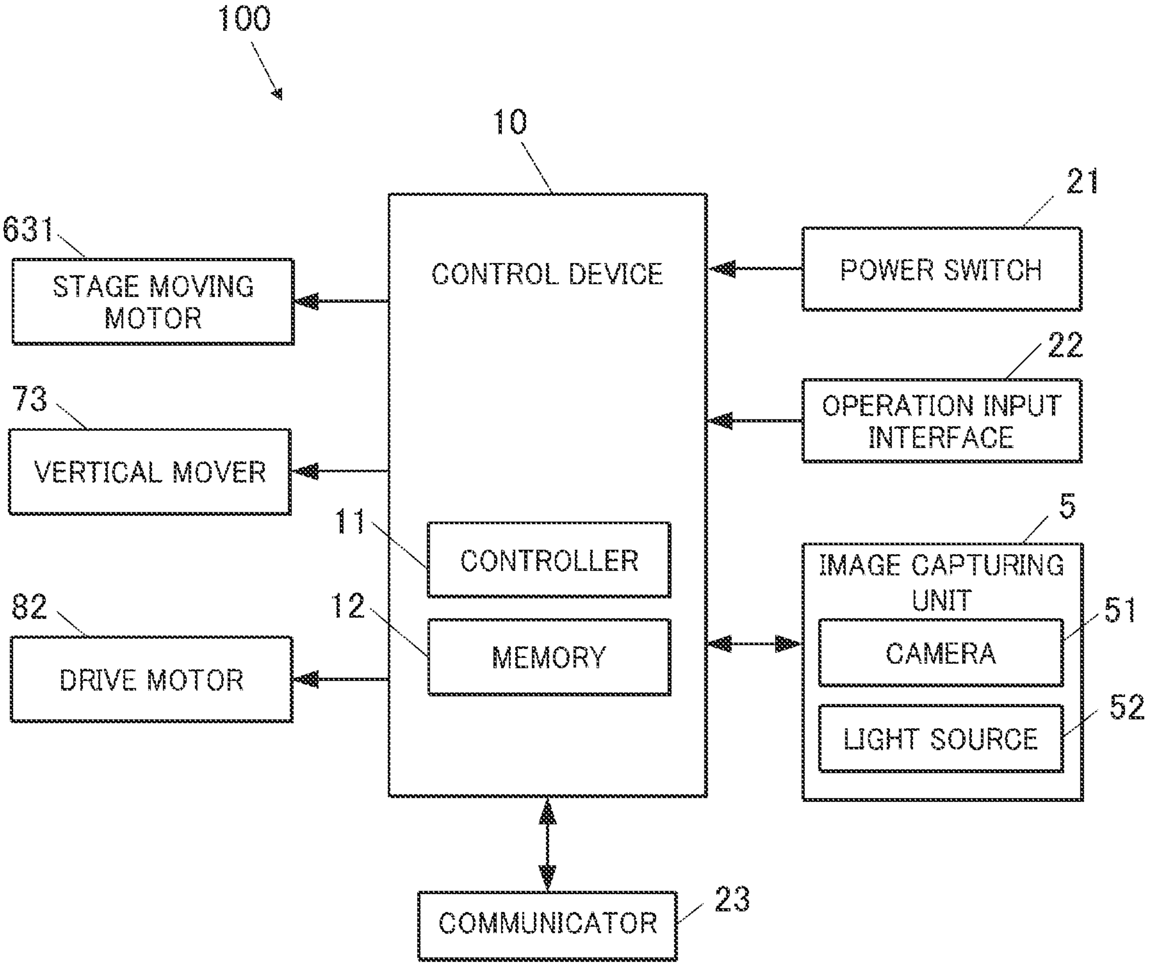
FIG. 8 is a main part block diagram showing a control configuration example of a cutting device according to an embodiment.

FIG. 8 is a main part block diagram showing a main part control configuration of the cutting device.

As shown in FIG. 8, the cutting device 100 of the present embodiment includes a power switch 21, an operation input interface 22, a communicator 23, the control device 10, and the like in addition to the above-described respective components.

The power switch 21 is provided on an upper surface (top surface), a lateral surface, or the like of the enclosure 2, for example, and is an operation button (a power switch button) or the like that turns on/off a power source of the cutting device 100. When the power switch 21 is operated, an operation signal is output to the control device 10, and the control device 10 performs control in accordance with the operation signal.

For example, when the power source is turned on by a switching operation on the power switch 21, the control device 10 activates each part of the cutting device 100.

The operation input interface 22 includes various buttons, a key input interface, and the like for the user to perform various operation inputs.

When an operation input is performed on the operation input interface 22, an operation signal is output to the control device 10, and the control device 10 performs control in accordance with the operation signal.

The communicator 23 is a communication tool that communicates with an external device. In the present embodiment, examples of the "external device" include a terminal device 20 (see FIG. 1; a smartphone, a tablet type terminal device, or a desktop PC of the user, for example) and the like.

Information input to and set in the external terminal device 20 is received by the cutting device 100 via the communicator 23. The controller 11 thereby receives the information from the external terminal device 20 via the communicator 23.

The technique for communication between the cutting device 100 and the terminal device 20 or the like is not particularly limited, and communication is performed by radio communication or the like based on the near-field radio communication standard such as a wireless LAN, Bluetooth (registered trademark), or Wi-Fi, for example. The communicator 23 includes an antenna chip and the like adaptable to communication systems and communication standards of various external devices with which the communicator 23 is assumed to communicate.

In the present embodiment, the operation interface 25 (see FIG. 1) of the terminal device 20 with which the cutting device 100 is capable of communicating via the communicator 23 also functions as an operation input interface through which various types of setting and the like are performed for the cutting device 100. The operation interface 25 in the terminal device 20 is a touch panel provided integrally on a surface of a display 26 (see FIG. 1), for example.

When the operation interface 25 is operated, an input signal corresponding to the operation is transmitted to the cutting device 100 via a controller not shown of the terminal device 20. Information input through the operation interface 25 is received by the controller 11 of the cutting device 100.

The types of the tape members S that can be set in the cutting device 100 of the present embodiment are registered in advance, for example. The user is able to input and set, through the operation interface 25 of the terminal device 20, the type of the tape member S (such as the level of size of the tape member S such as the tape member S for large (thick) fingers, small (thin) fingers, or normal (standard) fingers, for example) to be set in the cutting device 100 among the registered types. Specifically, for example, a plurality of types (such as the sizes "L", "M", and "S" of the tape member S, for example) are displayed on a list as options on the display 26 or the like, and the user selects his/her preference from the list so that the type of the tape member S is set.

The user is also able to perform input for setting or selecting information on a character, a symbol, or any pattern that the user wants to cut out from the tape member S with the cutting device 100 (that is, a design D (a desired pattern such as a character or a figure) that the user wants to apply to the region of the nail T) or the like, through the operation interface 25 of the terminal device 20.

Inputting and setting of the type of the tape member S to be set in the cutting device 100, inputting and setting of a desired pattern such as a character or a figure, and the like are not limited to the case of being performed through the terminal device 20, but may be performed through the operation input interface 22 of the cutting device 100.

The control device 10 of the cutting device 100 is a computer including the controller 11 implemented by a processor such as a central processing unit (CPU) and the memory 12 implemented by a read only memory (ROM) and a random access memory (RAM) or the like (neither shown), for example.

A part or the whole of the memory 12 may be a separate component, and may be provided outside the control device 10.

The memory 12 stores various programs for operating the cutting device 100 (such as programs for performing processing such as processing of recognizing the shape of the nail T or the like and processing of cutting the tape member S, for example), various types of data, and the like. When the controller 11 develops these programs to a workspace in the RAM, for example, and the programs are executed by the controller 11, the respective parts of the cutting device 100 are integrally controlled.

Particularly in the present embodiment, the controller 11 functions as an information acquirer that detects information including information on the region of the nail T (that is, the contour shape of the nail T or the outer shape of the nail T) from an image (a finger image acquired with the camera 51).

The information on the region of the nail T is, for example, vector data representing an outline that defines the region of the nail T by x and y coordinates or the like.

The controller 11 serving as the information acquirer may acquire not only the information on the region of the nail T, but also information on the region of the finger U (the outer shape of the finger U).

The controller 11 serving as the information acquirer performs various types of image processing of analyzing differences in color, brightness, and the like for a finger image, for example, to extract the contour, thereby acquiring the contour shape of the nail T, the contour shape of the finger U, and the like. The technique for the controller 11 serving as the information acquirer to obtain the information on the region of the nail T and the information on the region of the finger U from the finger image is not particularly limited.

The controller 11 of the present embodiment also functions as a pattern receiver that receives information on a nail design (a desired pattern) that the user wants to apply to the nail T. As described earlier, the design that the user wants to apply to the nail T (the desired pattern such as a character or a figure) is input through the operation interface 25 of the terminal device 20 or the operation input interface 22. The controller 11 acquires an operation signal to receive the desired pattern that the user wants to apply to the nail T.

The controller 11 of the present embodiment also functions as an adjuster which, based on the information on the region of the nail T acquired by the information acquirer, adjusts the desired pattern selected and input by the user so as to be located within the region of the nail T (that is, such that the desired pattern is not located out of the region of the nail T). That is, the position, size, and orientation at which the pattern is to be arranged on the tape member S (the "base tape Sa" or the "mask base Sb"), their relative positional relationship, and the like are adjusted as appropriate such that the desired pattern is located within the region of the nail T. The position in the region of the nail T and the size at which the user wants to apply the design may be set by the user. In a case where the position and size are set, the controller 11 arranges the desired pattern in the region of the nail T such that the set conditions are satisfied. In a case where there is no particular setting for arrangement of the design, the arrangement of the desired pattern is adjusted with respect to the tape member S (the "base tape Sa" or the "mask base Sb") (with respect to the outer shape of the tape member S) such that the pattern is arranged at a size as large as possible substantially at the center of the region of the nail T, for example.

The controller 11 of the present embodiment also functions as a cutting controller which, based on an adjustment result obtained by the adjuster, operates each part of the cutting plotter unit 7 which is the cutter to produce the masking tape Sc with a pattern (the cutout C2 shown in FIG. 12, FIG. 13A, and FIG. 13B) cut out in a region corresponding to the region of the nail T.

Specifically, the controller 11 operates the stage moving motor 631 in the cutting plotter unit 7 to move as appropriate the tape setting stage 62 with the tape member S arranged thereon in the Y-direction (the front-rear direction of the device), and operates the drive motor 82 to move as appropriate the cutting plotter unit 7 together with the carriage 71 in the X-direction (the left-right direction of the device).

The controller 11 then operates the vertical mover 73 to apply the cutting blade 721 to the tape member S as appropriate while relatively moving the tape setting stage 62 and the carriage 71 in the X- and Y-directions as described above, thereby forming the desired cutout C2 in the tape member S.

In a case such as when the "base tape Sa" which is the tape member S before cutting has a rectangular shape (see FIG. 5A) or when the "base tape Sa" is too wide to attach to the finger U of the user even in the state where the corners on the fingertip side have been cut, the controller 11 serves as the cutting controller to control the cutting plotter unit 7 and the like as appropriate so as to cut off the "mask base Sb" from the "base tape Sa" in conformance to the outer shape of the finger U of the user.

Action of Cutting Device and Cutting Method

Next, a cutting method performed by the cutting device of the present embodiment will be described with reference to FIG. 9 to FIG. 13C and the like.

Figure 9:
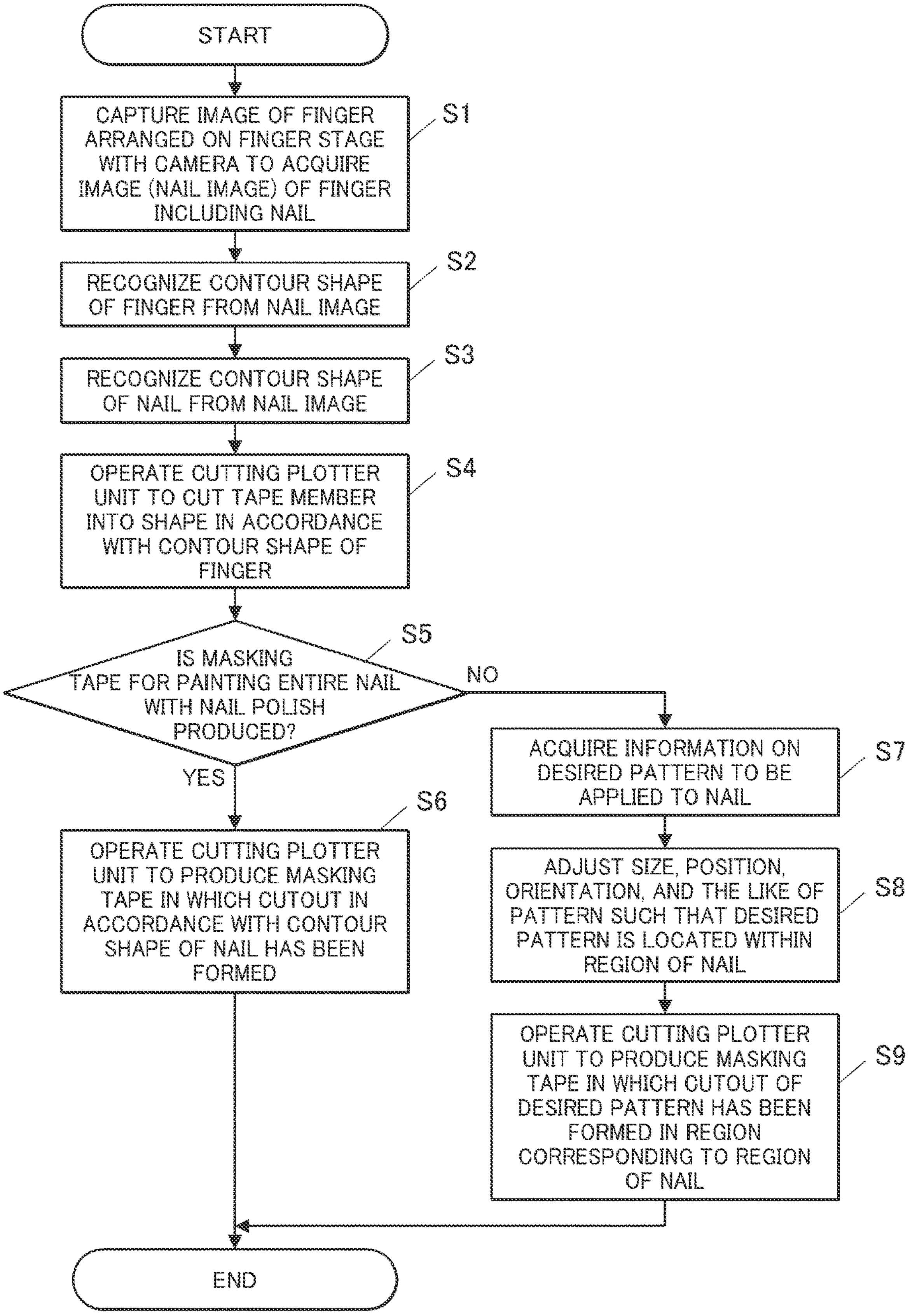
FIG. 9 is a flow chart showing cutting processing according to an embodiment.

FIG. 9 is a flow chart showing cutting processing performed by the cutting device according to the present embodiment.

For performing the cutting processing, the tape member S to be a target of cutting is first set on the tape setting stage 62 in the second space Ar2.

In the case where a plurality of types (sizes) of the tape members S are prepared as described earlier, the user operates the operation interface 25 of the terminal device 20 or the operation input interface 22 of the cutting device 100 to select the tape member S that matches the thickness and the like of the finger U of his/her own from the list of options registered in advance. The type (size) of the tape member S is thereby set.

The user then sets the selected and set tape member S on the tape setting stage 62. The user also performs setting for the masking tape Sc that he/she wants to produce with the cutting device 100 through the operation interface 25 of the terminal device 20, the operation input interface 22, or the like.

Examples of the setting for the masking tape Sc include setting as to whether to produce the masking tape Sc for painting the entire nail T with the nail polish, or whether to produce the masking tape Sc for drawing any design D (see FIG. 13C) on the nail T. In the latter case, a desired pattern is set in accordance with the design (nail design) D to be drawn on the nail T. On this occasion, in a case where the user has preferences on the position at which the design D is to be drawn (such as the center of the nail or the upper right of the nail T, for example), the size (such as whether to draw the design D widely in the entire region of the nail T or whether to draw the design D small as a logo, for example), and the like, these types of information are also set. The information concerning the desired pattern is received by the controller 11 serving as the pattern receiver.

The finger U corresponding to the nail T to which the user wants to apply the design D is arranged on the finger stage 4 in the second space Ar2. When the finger U is arranged, the controller 11 operates the image capturing unit 5 to cause the camera 51 to capture an image of the finger U arranged on the finger stage 4 as shown in FIG. 8. An image thereby obtained (a finger image which is an image of the finger including the nail T) is sent to the control device 10, and the finger image is acquired by the controller 11 (step S1).

In a case where the user wants to produce the masking tapes Sc for a plurality of fingers U, finger images of the fingers U to which the user wants to attach the masking tapes Sc may be acquired sequentially, and work of cutting off or cutting out the masking tapes Sc may be performed collectively. Alternatively, finger images of the fingers U may be acquired one by one, and the work of cutting off or cutting out the masking tape Sc to be attached to each of the fingers U may be performed.

The controller 11 performs image processing or the like on the finger image to recognize the contour shape of the finger U (step S2). The controller 11 also performs image processing or the like on the finger image to recognize the contour shape of the nail T (the region of the nail T) (step S3).

In such a case where the tape member S set on the tape setting stage 62, for example, is the "base tape Sa" (the first base tape Sa1) or the like having a rectangular shape as shown in FIG. 5A, the controller 11 operates each part of the cutting plotter unit 7 which is the cutter to cause the mask base Sb having a shape corresponding to the contour shape (outer shape) of the finger U of the user to be cut off from the base tape Sa (the first base tape Sa1) based on information on the contour shape (outer shape) of the finger U acquired by the controller 11 as the information acquirer (step S4). That is, in this case, the position (relative position) at which the shape corresponding to the contour shape (outer shape) of the finger U is to be cut off is adjusted and set with respect to the position of the base tape Sa (the first base tape Sa1), and the mask base Sb is cut off from the base tape Sa (the first base tape Sa1) with the cutting plotter unit 7.

The expression "cut into a shape in accordance with the contour shape of the finger U" indicates, for example, cutting the corners on the fingertip side to make remaining corner portions less likely to be lifted up when attached to the finger U. The mask base Sb serves as a base for producing the masking tape Sc, and has a shape similar to the shape of the base tape Sa (the second base tape Sa2) shown in FIG. 5B.

Even if the tape member S set on the tape setting stage 62 is the base tape Sa (the second base tape Sa2) processed into a shape which is easy to attach to the finger U with corners on the fingertip side already cut as shown in FIG. 5B, the controller 11 operates each part of the cutting plotter unit 7 to cause the base tape Sa (the second base tape Sa2) to be cut based on the information on the contour shape (outer shape) of the finger U acquired by the controller 11 as the information acquirer in such a case where the width of the base tape Sa (the second base tape Sa2) is too wide for the width of the finger U of the user.

That is, the controller 11 operates each part of the cutting plotter unit 7 to cause the mask base Sb having a shape corresponding to the contour shape (outer shape) of the finger U (the "mask base Sb" having such a shape as indicated by a broken line in FIG. 5B) to be cut off from the base tape Sa (the second base tape Sa2). In this case, processing such as cutting both ends of the base tape Sa (the second base tape Sa2) so as to match the width of the finger U of the user, for example, is performed.

In a case where the base tape Sa (the second base tape Sa2) as shown in FIG. 5B is attached to the finger U of the user as it is (that is, in a case where cut-off processing such as reducing the width, for example, is not necessary), step S4 which is the step of cutting off the mask base Sb from the base tape Sa is omitted.

The controller 11 then determines whether or not the masking tape Sc to be produced is the masking tape Sc for masking when painting the entire nail T with the nail polish, based on information input and set by the user through the operation interface 25 of the terminal device 20, the operation input interface 22 of the cutting device 100, or the like (step S5).

In a case where the masking tape Sc as desired is the masking tape Sc for masking when painting the entire nail T with the nail polish (YES in step S5), the controller 11 operates each part of the cutting plotter unit 7 to cause the cutout C1 in accordance with the contour shape of the nail T to be formed, and produces the masking tape Sc (the masking tape Sc1) in which the cutout C1 has been formed (step S6).

Figure 10:
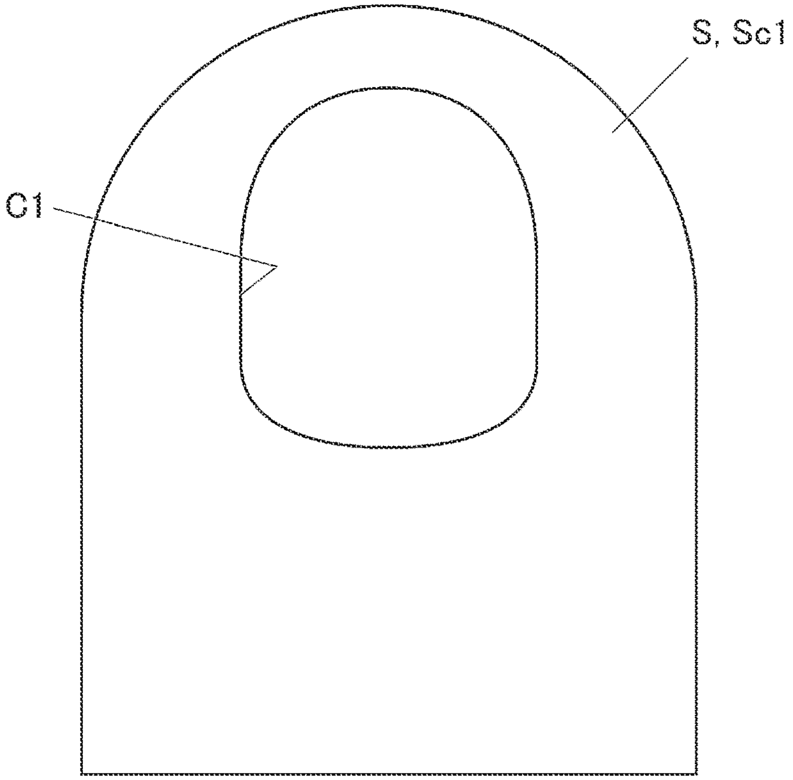
FIG. 10 is a plan view showing an example of a masking tape in which a nail-shaped cutout has been formed.

In this case, the masking tape Sc (the masking tape Sc1) in which the cutout C1 has been formed in conformance to the shape of the nail T of the user is produced at a position corresponding to the nail T (a relative position of the nail T with respect to the finger U) in the tape member S (the base tape Sa, or the mask base Sb cut off in accordance with the shape of the finger U), as shown in FIG. 10, for example.

Figure 11:
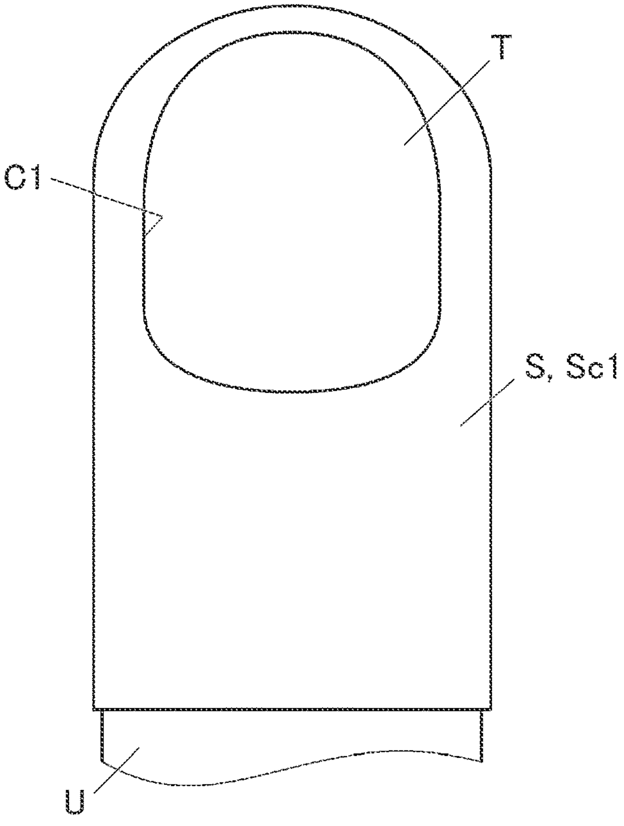
FIG. 11 is a top view of a finger, showing a state in which the masking tape shown in FIG. 10 has been attached to the finger.

FIG. 11 shows a state in which the masking tape shown in FIG. 10 is attached to a finger.

When painting the entire nail T with the nail polish in the state where the masking tape Sc in which the cutout C1 having the shape of the nail T has been formed is attached to the finger U as shown in FIG. 11, the inside of the range of the nail T is painted with the nail polish and the solution is prevented from adhering to the finger U, thus enabling the treatment of painting the entire nail T with the nail polish to be performed easily.

On the other hand, in a case where the masking tape Sc as desired is not the masking tape Sc for masking when painting the entire nail T with the nail polish (NO in step S5), that is, in a case where the user wants to produce the masking tape Sc for partially applying the design D or the like, the controller 11 acquires information on a desired pattern to be applied to the nail T (step S7). Specifically, the controller 11 acquires information input and set by the user through the operation interface 25 of the terminal device 20, the operation input interface 22 of the cutting device 100, or the like.

The size, position, orientation, and the like of the pattern are then adjusted as appropriate such that the desired pattern is located within the region of the nail T (step S8). As described earlier, in the case where the user also has input and set the position and size at which he/she wants to arrange the design D, the controller 11 adjusts the size, position, and the like of the pattern considering those pieces of input information as well.

Specifically, the controller 11 adjusts a relative positional relationship of the pattern with respect to the tape member S (the base tape Sa or the mask base Sb) (that is, the place, size, and orientation of the pattern to be arranged on the tape member S, or the like) such that the pattern is arranged at the position corresponding to the nail T (a relative position of the nail T with respect to the shape of the finger U) on the tape member S (the base tape Sa, or the mask base Sb cut off in accordance with the shape of the finger U). That is, in the case where the masking tape Sc is produced, the controller 11 performs adjustment such that the pattern is located within the region applied to the nail T.

When the position at which the pattern is to be cut out is settled, the controller 11 operates the cutting plotter unit 7 to produce the masking tape Sc (the masking tape Sc2) in which the cutout C2 of the desired pattern has been formed in the region corresponding to the region of the nail T (step S9).

When the cutting operation is completed for the tape member S, it is preferable to notify the user of the completion by turning on a lamp or the like. In a case where the cutting device 100 includes a display, the completion may be displayed on the display, and in a case of producing another masking tape Sc, a message prompting the user to set the tape member S for producing the next masking tape Sc on the tape setting stage 62 may be displayed on the display. The notification and display may be performed by display on the display 26 of the terminal device 20 that communicates with the cutting device 100.

For example, in a case where the masking tape Sc desired by the user is the masking tape Sc for painting the nail T with the nail polish in a T shape to draw the T-shaped design D, the user performs operation input of the T-shaped pattern as the desired pattern through the operation interface 25 of the terminal device 20, the operation input interface 22 of the cutting device 100, or the like.

Figure 12:
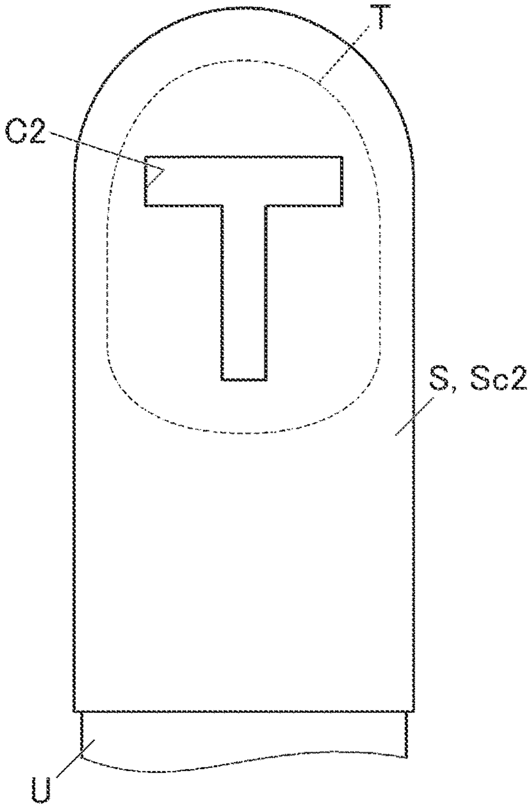
FIG. 12 is a plan view showing an example of a masking tape in which a cutout of a T-shaped pattern has been formed.

The controller 11 having received an operation signal controls operation of the cutting plotter unit 7 to produce the "masking tape Sc2" in which the cutout C2 having the T-shaped pattern has been formed so as to be located within the contour of the nail T indicated by a broken line in the drawing, as shown in FIG. 12.

In a case where the user wants to form a pattern (the design D) in which a single character, figure, or the like is painted separately with nail polishes of a plurality of colors, for example, the nail polishes need to be applied by each color. Thus, in this case, the masking tape Sc2 is also produced for each of the colors.

When an input for producing the masking tape Sc2 for drawing a pattern (the design D) in which a star figure is painted separately in a plurality of colors such that the upper half is painted in red and the lower half is painted in pink is performed through the operation input interface 22, for example, the controller 11 having received an operation signal controls operation of the cutting plotter unit 7 to produce the masking tape Sc2 for each color, thereby producing two masking tapes Sc2.

Figure 13A:
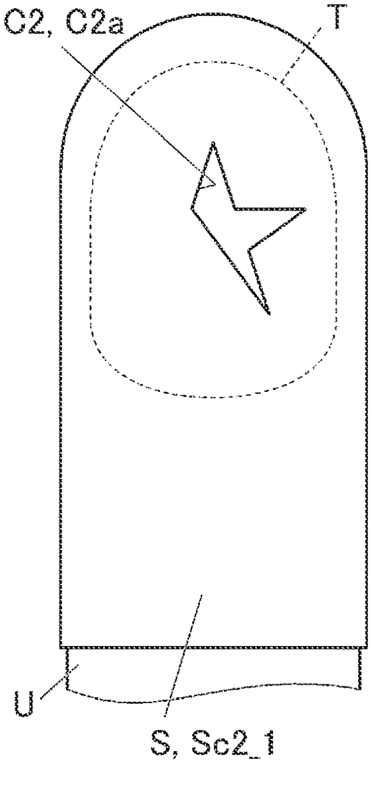
FIG. 13A is a plan view showing an example of a masking tape in which a cutout of a pattern for forming a star design has been formed.
Figure 13B:
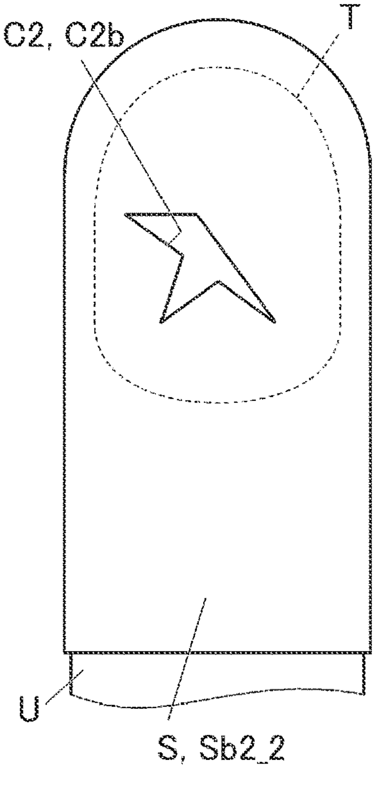
FIG. 13B is a plan view showing an example of a masking tape in which a cutout of a pattern for forming the star design has been formed.

That is, a "first masking tape Sc2_1" in which the cutout C2 (a first cutout C2*a*) obtained by cutting out a shape (pattern) of the upper half of the star figure as shown in FIG. 13A has been formed, and a "second masking tape Sc2_2" in which the cutout C2 (a second cutout C2*b*) obtained by cutting out a shape (pattern) of the lower half of the star figure as shown in FIG. 13B has been formed are produced.

Figure 13C:
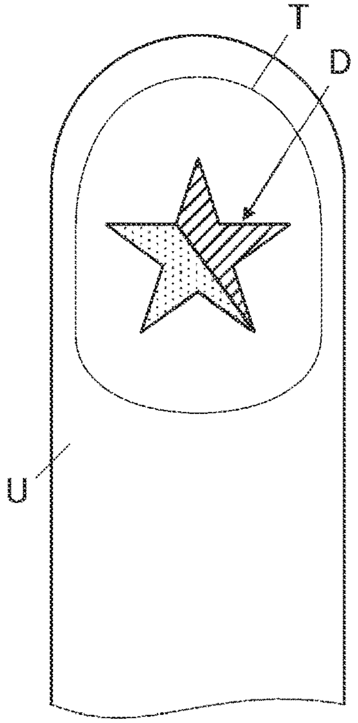
FIG. 13C is a top view of a finger, showing a nail to which star-design nail art has been applied using the masking tapes shown in FIG. 13A and FIG. 13B.

Then, the user first paints the inside of the first cutout C2*a* with a red nail polish in a state where the first masking tape Sc2_1 is attached to the finger U, and thereafter paints the inside of the second cutout C2*b* with a pink nail polish in a state where the masking tape is changed to the second masking tape Sc2_2. The user is thereby able to draw the star design D with top and bottom having different colors as shown in FIG. 13C on the nail T of his/her own.

By producing the masking tape Sc using the cutting device 100 as described above, the user is able to perform treatment of simply painting the nail T with a nail polish or the like while applying masking with the masking tape Sc that matches the shape of the nail of his/her own also in the case where the user manually paints the nail T with the nail polish or the like to apply the desired design D to the nail T.

As described above, according to the present embodiment, the cutting device 100 includes the controller 11 that functions as the information acquirer that acquires information on the region of the nail T, the pattern receiver that receives information on the desired pattern, the adjuster that adjusts the pattern so as to be located within the region of the nail T based on the information on the region of the nail T acquired by the information acquirer, and the cutting controller that operates the cutting plotter unit 7 which is the cutter based on an adjustment result obtained by the adjuster to produce the masking tape Sc in which the pattern has been cut out in a region corresponding to the region of the nail T.

This enables the masking tape Sc that matches the shape of the nail T of the user to be produced easily. Performing the treatment of painting the nail T with the nail polish using such a masking tape Sc prevents the nail polish from being located out of the portion to be painted, and enables the treatment to be performed on the portion to be painted while keeping hands clean.

The cutting device 100 of the present embodiment also includes the controller 11 that functions as the information acquirer that acquires information on the outer shape of the finger U and information on the region of the nail T, the pattern receiver that receives information on a desired pattern, the adjuster that adjusts the pattern so as to be located within the region of the nail T based on the information on the outer shape of the finger U and the information on the region of the nail T acquired by the information acquirer, and the cutting controller that operates the cutter to cut off the mask base Sb having the shape corresponding to the outer shape of the finger U from the base tape Sa based on the information on the outer shape of the finger U acquired by the information acquirer and to produce the masking tape Sc in which the pattern adjusted by the adjuster has been cut out in a portion of the mask base Sb corresponding to the region of the nail T.

For example, there are some cases in which the finger U of the user is thinner than general fingers. In such a case, the use of the base tape Sa produced in a standard width as it is may result in extra width when winding the masking tape Sc around the finger U, so that the user fails to attach the masking tape Sc well.

Even in such a case, the masking tape Sc that matches the finger U of the user is produced by adjusting the base tape Sa into a shape that matches the finger U of the user and cutting the base tape Sa as appropriate. This enables the treatment of painting the nail T with the nail polish in the state where the masking tape Sc is appropriately attached to the finger U for masking.

This enables the masking tape Sc having an optimum width and shape to be obtained regardless of the thickness and the like of the finger U of the user, and facilitates production of the masking tape Sc which is easy to attach and matches the shape of the nail T of the user. Performing the treatment of painting the nail T with the nail polish using such a masking tape Sc prevents the nail polish from being located out of the portion to be painted and enables the treatment to be performed while keeping hands clean.

In the present embodiment, the controller 11 serving as the information acquirer acquires information at least on the region of the nail T based on a finger image acquired by capturing an image of the finger U with a predetermined image capturer (the camera 51 of the image capturing unit 5).

This enables the cutout C1 or C2 to be reliably located within the region of the nail, and prevents a range to be attached to a portion other than the nail T (a skin portion of the finger U) from being cut out by mistake.

In the present embodiment, the controller 11 serving as the adjuster that adjusts a place from which a pattern is to be cut out adjusts at least any of the position, orientation, and size of the pattern.

The design D to be drawn on the nail T depends on the user. In a case where the user does not want to compromise on the position at which the pattern is to be provided, the pattern is adjustable so as to be located within the region of the nail T by changing the orientation or size. In a case where the user does not want to change the size, another element such as the position is adjusted. This enables nail art treatment of drawing the design D desired by the user on the nail T to be performed easily using the masking tape Sc.

Second Embodiment

A second embodiment of a cutting device, a program, and a cutting method according to the present disclosure will be described first with reference to FIG. 14 to FIG. 16.

In the second embodiment, all the fingers of one hand are first arranged on a finger stage, and finger images are acquired for all the fingers for which the user wants to produce masking tapes. Thereafter, a masking tape for each of the fingers is produced. Thus, in the case where the user wants to produce masking tapes for a plurality of fingers, he/she only needs to place his/her hand on the finger stage without the need to insert/withdraw the fingers into/from the device one by one, thus enabling a plurality of finger images to be acquired easily.

Detailed description will be given below with reference to the drawings.

Figure 14:
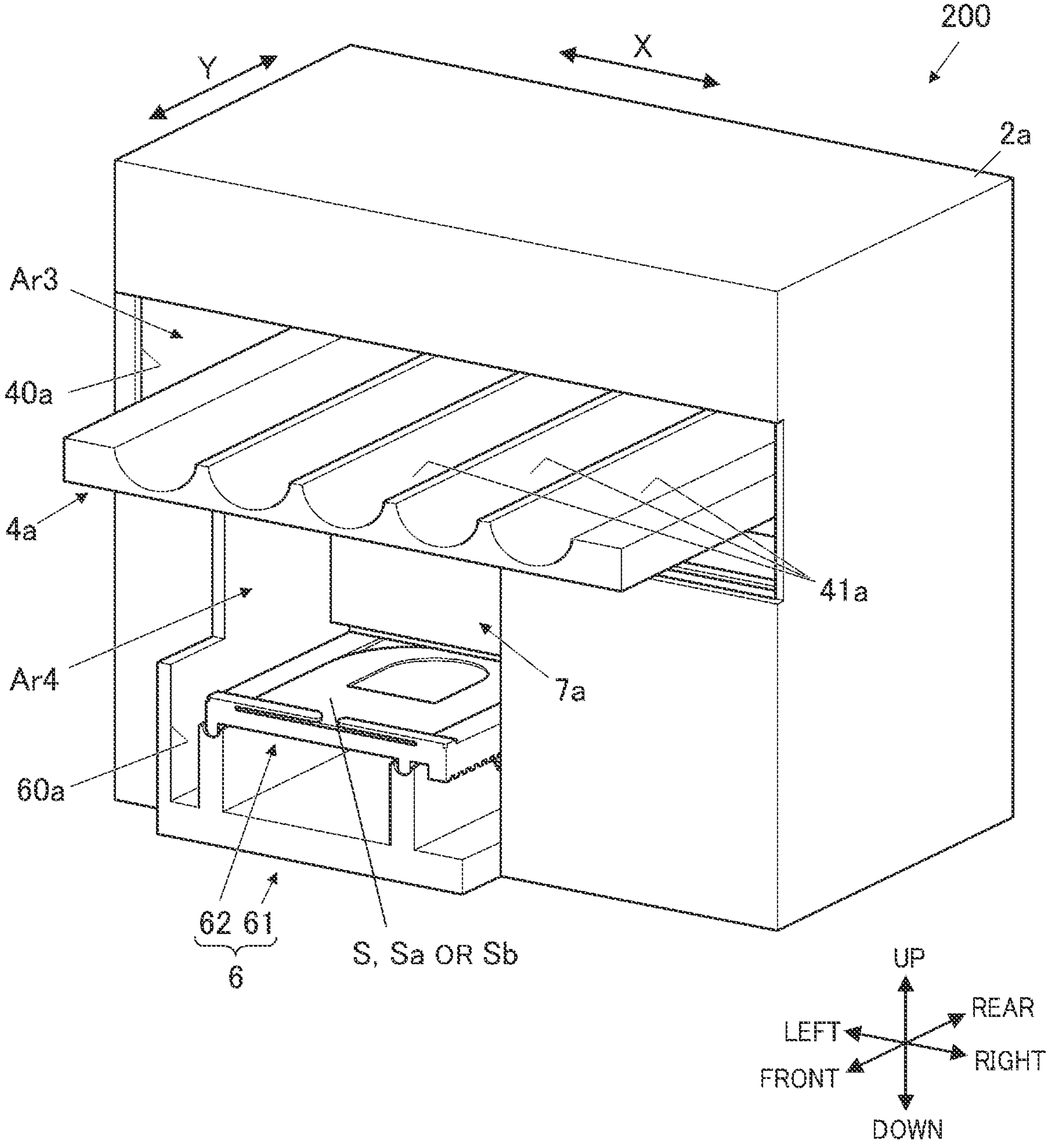
FIG. 14 is a main part perspective view showing an external configuration of a cutting device according to a second embodiment.

FIG. 14 is a main part perspective view showing an external configuration of the cutting device according to the present embodiment. FIG. 15 is a perspective view showing an internal configuration with a front surface side and an upper surface side of the cutting device shown in FIG. 14 cut away.

Figure 15:
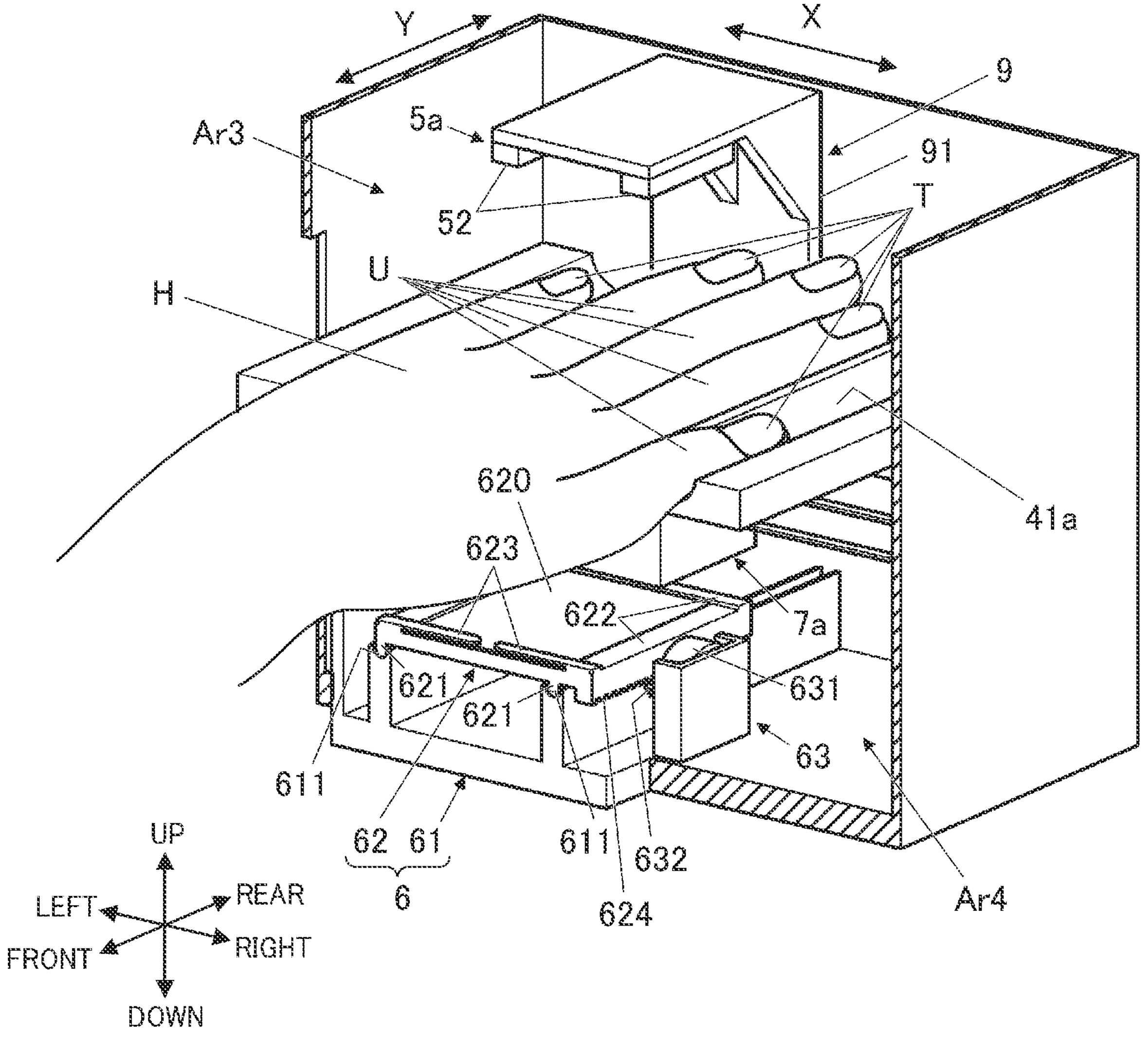
FIG. 15 is a main part perspective view schematically showing a state in which fingers have been set in the cutting device shown in FIG. 14 with a front surface side and an upper surface of the device cut away.

As shown in FIG. 14 and FIG. 15, a cutting device 200 includes an enclosure 2*a* having a substantially box-like shape.

A finger stage 4*a* extending in a device width direction (the X-direction) is provided slightly above the center in the up-down direction of the cutting device 200. As shown in FIG. 15, fingers U whose images are to be captured with the camera 51 of an image capturing unit 5*a* which is an image capturer are arranged on the finger stage 4*a*.

The finger stage 4*a* of the present embodiment enables the plurality of fingers U (all the fingers U from the thumb to the little finger of one hand H as shown in FIG. 15) to be arranged next to each other in the finger width direction. Specifically, a recess 41*a* that receives the pad portion of the finger U is prepared for each of the five fingers U of one hand. Merely by placing the one hand H on the finger stage 4*a* in a state where the fingers U are naturally spread out, the fingers U are arranged in the respective recesses 41*a*. This enables the five fingers U to be arranged on the finger stage 4*a* simultaneously, and brings about a state in which the nail T of each of the fingers U is turned up (see FIG. 15). It is not necessary to arrange the fingers U in all the recesses 41*a* of the finger stage 4*a*. For example, four fingers from the index finger to the little finger of one hand or the thumbs of both hands may be arranged in the recesses 41*a*. In a case of arranging only two or three fingers U such as when arranging the thumbs of both hands, they may not be arranged in adjacent ones of the recesses 41*a*, but may be arranged separately at positions easy for the user to arrange.

The position at which the finger stage 4*a* is provided in the enclosure 2*a* and a portion above the position constitute an opening 40*a* opened to the front surface side of the device. The height of the opening 40*a* is not particularly limited, and the opening 40*a* is opened at least to such a height that the fingers U to be arranged on the finger stage 4*a* are inserted/withdrawn into/from the device without any problem.

The finger stage 4*a* also functions as a partition that divides the enclosure 2*a* into upper and lower spaces. The space above the finger stage 4*a* constitutes a first space Ar3 for acquiring an image (a finger image) of the finger U (the finger U including the nail T) with the image capturing unit 5*a* (the camera 51 of the image capturing unit 5*a*).

Since the finger stage 4*a* serving as the partition divides the enclosure 2*a* into the upper and lower spaces so that the space above the finger stage 4*a* (the first space Ar3) serves as the space for acquiring a finger image, a compact device configuration is achieved without increase in device width of the cutting device 200 even though the one hand H is allowed to be placed on the finger stage 4*a* to arrange the plurality of fingers U next to each other.

The finger stage 4*a* may have both right and left ends fixed to sidewalls of the enclosure 2*a* or fixed onto a plate-like member or the like provided in the device width direction. Alternatively, the finger stage 4*a* may be caught on the sidewalls of the enclosure 2*a* or the plate-like member in a removable state without being fixed. In a case where the finger stage 4*a* is removable, the finger stage 4*a* may be replaced and used as appropriate depending on whether the fingers U to be arranged on the finger stage 4*a* are the fingers U of the right hand H or the fingers U of the left hand H, or the like, for example.

The space below the finger stage 4*a* constitutes a second space Ar4 for producing the masking tape Sc from the base tape Sa by performing a predetermined cutting operation. The tape stage 6 on which the tape member S is to be arranged is provided on a bottom surface of the second space Ar4. Since the tape stage 6 has a configuration similar to that of the first embodiment, the same members are denoted by the same reference numerals, and description thereof will be omitted.

The position at which the tape stage 6 is provided in the enclosure 2*a* and a portion above the position constitute an opening 60*a* opened to the front surface side of the device. The width and height of the opening 60*a* are not particularly limited, and the opening 60*a* is opened at least to such a size that there is no problem when arranging the tape member S on the tape stage 6 or pulling out the arranged tape member S.

A cutting plotter unit 7*a* and the shaft 81 that is inserted through the through-hole 711 of the carriage 71 and serves as a guide when the carriage 71 is moved are provided in the second space Ar4, similarly to the first embodiment. The drive motor 82, the driven pulley 84 driven by the pulley 83 (drive pulley) coaxial with the drive motor 82, and the timing belt 85 wound between the pulley 83 and the driven pulley 84 are provided on the surface on the farther side of the device in the second space Ar4 similarly to the first embodiment. The belt coupler 712 provided for the carriage 71 is coupled to the timing belt 85 similarly to the first embodiment. Since the configuration of the shaft 81, the drive motor 82 and the pulley 83, the driven pulley 84, and the timing belt 85 is similar to that of the first embodiment, the same members are denoted by the same reference numerals, and description thereof will be omitted.

In the present embodiment, the image capturing unit 5*a* serving as the image capturer that captures an image of the finger U arranged on the finger stage 4*a* and the cutting plotter unit 7*a* which is the cutter that performs a cutting operation on the base tape Sa based on information acquired based on an image of the finger U (a finger image which is an image of the finger U including the nail T) captured with the image capturing unit 5*a* (the camera 51 of the image capturing unit 5*a*) to produce the masking tape Sc are movable in the finger width direction of the finger U arranged on the finger stage 4*a* (the array direction of the fingers U in the case where the plurality of fingers U are arranged; in the present embodiment, the device width direction or the X-direction) by means of the same mover (a driver).

Figure 16:
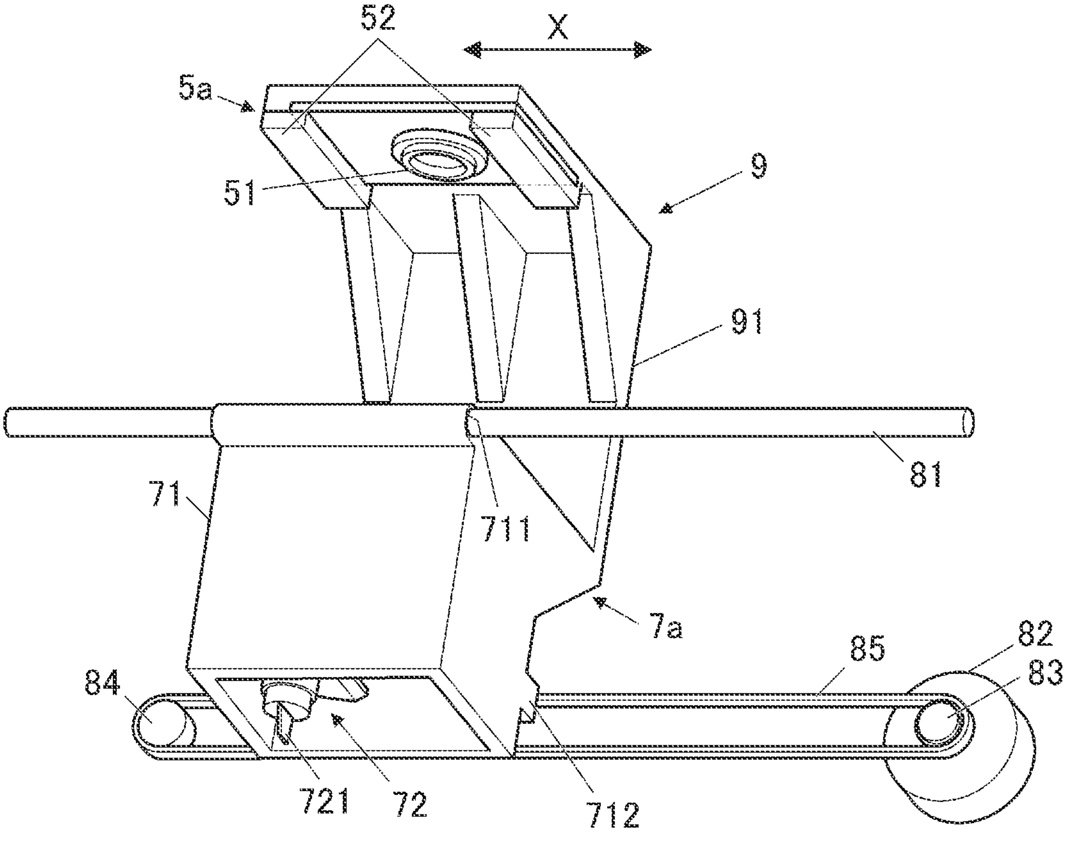
FIG. 16 is a perspective view showing a main part of a movable body including an image capturing unit and a cutting plotter unit of the cutting device as well as a mover thereof according to the second embodiment.

FIG. 16 is a main part perspective view showing a configuration of the image capturing unit 5*a* and the cutting plotter unit 7*a* in the present embodiment as well as the mover (that is, the shaft 81, the drive motor 82 and the pulley 83, the driven pulley 84, and the timing belt 85) that moves the image capturing unit 5*a* and the cutting plotter unit 7*a*.

As shown in FIG. 16, the image capturing unit 5*a* and the cutting plotter unit 7*a* are coupled with a coupling frame 91 to constitute an integral movable body 9.

Although not shown, the finger stage 4*a* serving as the partition does not abut against the surface on the farther side of the enclosure 2*a*, but a predetermined gap is ensured on the farther side. In a case where a plate-like member or the like that holds the finger stage 4*a* is provided, the plate-like member similarly does not abut against the surface on the farther side of the enclosure 2*a*.

The movable body 9 is configured such that part of the coupling frame 91 is inserted through the gap between the finger stage 4*a* serving as the partition and the surface on the farther side of the enclosure 2*a*, and when the mover (that is, the shaft 81, the drive motor 82 and the pulley 83, the driven pulley 84, and the timing belt 85) operates, the cutting plotter unit 7*a* and the image capturing unit 5*a* coupled to the cutting plotter unit 7*a* are moved integrally. That is, in the present embodiment, the cutting plotter unit 7*a* and the image capturing unit 5*a* are both moved by driving of the same drive motor 82, and have a common driving source (the drive motor 82).

Since the other configuration is similar to that of the first embodiment, description thereof will be omitted.

Next, a cutting method performed by the cutting device 200 of the present embodiment will be described.

In the present embodiment, the hand H on the side corresponding to the nail T on which the user wants to perform the treatment of painting the nail T with the nail polish using the masking tape Sc is arranged on the finger stage 4*a*. Specifically, the fingers U of the hand H are arranged in the respective recesses 41*a* to arrange the fingers U next to each other on the finger stage 4*a* (see FIG. 15). The tape member S is set on the tape setting stage 62 of the tape stage 6 similarly to the first embodiment.

When a power supply of the cutting device 200 is turned on and operation is started, the controller 11 operates the mover (that is, the shaft 81, the drive motor 82 and the pulley 83, the driven pulley 84, and the timing belt 85) to move the movable body 9 from one end to the other end in the device width direction. The image capturing unit 5*a* integrated with the cutting plotter unit 7*a* (the carriage 71 of the cutting plotter unit 7*a*) thereby sequentially passes above the fingers U arranged on the finger stage 4*a*. At this time, the controller 11 turns on the light source 52 of the image capturing unit 5*a* and captures images of the fingers U one by one with the camera 51 while illuminating the fingers U, thus causing finger images to be acquired.

During the cutting operation on the tape member S, the cutting plotter unit 7*a* reciprocates in the X-direction as appropriate and the vertical mover 73 operates to move the cutting blade 721 up/down. Thus, the entire movable body 9 vibrates. This is the reason why the cutting operation is not performed by the cutting plotter unit 7*a* during the operation of capturing finger images with the image capturing unit 5*a*. Timing of capturing finger images with the image capturing unit 5*a* and timing of the cutting operation performed by the cutting plotter unit 7*a* are not particularly limited. For example, it is preferable that finger images be first acquired for all the fingers U, and while performing an image analysis for each of the images, the cutting operation on the tape member S be performed by the cutting plotter unit 7*a* in sequence from a finger image for which the image analysis has been finished and data for the cutting operation has been produced.

The finger images acquired with the camera 51 are acquired by the controller 11. The finger image is subjected to an image analysis for each of the fingers U, and the outer shape of the finger U and the shape of the region of the nail T (an inner side region of the outline of the nail) are recognized by the controller 11.

For example, in a case where five fingers from the thumb to the little finger of the one hand H are placed on the finger stage 4*a*, an image of the nail T or the finger U cannot be captured from directly above with the camera 51 if any of the fingers U such as the thumb is arranged in a tilted state. Even in such a case, the controller 11 may be capable of performing image correction processing such as tilt correction to obtain images similar to those captured from directly above.

When the outer shape of the finger U and the shape of the region of the nail T are acquired, the controller 11 operates the mover (that is, the shaft 81, the drive motor 82 and the pulley 83, the driven pulley 84, and the timing belt 85) to cut off the mask base Sb in conformance to the shape of the first finger U from the base tape Sa.

In the case of forming the cutout C1 corresponding to the region of the nail T in the mask base Sb, the controller 11 further operates the mover to form the cutout C1. The masking tape Sc1 having the cutout C1 is thereby formed. In the case of forming the cutout C2 having a desired pattern in the mask base Sb, the controller 11 adjusts the position, size, orientation, and the like at which the desired pattern is to be arranged such that the desired pattern is located within a region corresponding to the region of the nail T in the mask base Sb (that is, such that the desired pattern is not located out of the region of the nail T).

When a place of the mask base Sb from which the pattern is to be cut out is settled, the controller 11 operates the mover (that is, the shaft 81, the drive motor 82 and the pulley 83, the driven pulley 84, and the timing belt 85) to cut out the desired pattern from the mask base Sb, thereby forming the cutout C2. The masking tape Sc2 having the cutout C2 is thereby formed.

When the cutting operation is completed for one tape member S, it is preferable that a lamp or the like be turned on to notify the user of the completion. In a case where the cutting device 200 includes a display, the completion may be displayed on the display. A message prompting the user to set the tape member S for producing the next masking tape Sc on the tape setting stage 62 may be displayed.

Since the remaining points are similar to those of the first embodiment, description thereof will be omitted.

As described above, according to the present embodiment, effects similar to those of the first embodiment are obtained, and the following effects are obtained additionally.

That is, the cutting device 200 of the present embodiment enables one hand H to be arranged on the finger stage 4*a* on which the fingers U are to be arranged, and enables the plurality of fingers U such as five fingers of one hand to be arranged simultaneously.

Thus, when capturing finger images with the camera 51, the user only needs to place the one hand H on the finger stage 4*a*, so that the fingers U are collectively arranged merely by placing the one hand. This eliminates the need to replace and arrange the fingers U one by one in the case where the user wants to produce the masking tapes Sc for the plurality of fingers U, resulting in user convenience. Since the masking tape Sc is produced for each of the fingers U after acquiring finger images collectively, the masking tapes Sc are produced efficiently.

The cutting device 200 of the present embodiment includes the camera 51 of the image capturing unit 5*a* serving as the image capturer that captures images of the fingers U, the finger stage 4*a* on which the fingers U whose images are to be captured with the camera 51 are to be arranged, the cutting plotter unit 7*a* serving as the cutter that performs the cutting operation on the base tape Sa based on information acquired based on an image of the finger U (a finger image including an image of the nail T) captured with the camera 51, thereby producing the masking tape Sc, and the mover (that is, the shaft 81, the drive motor 82 and the pulley 83, the driven pulley 84, and the timing belt 85) that moves the image capturing unit 5*a* (the camera 51 of the image capturing unit 5*a*) and the cutting plotter unit 7*a* in the finger width direction of the fingers U arranged on the finger stage 4*a*.

In the present embodiment, the finger stage 4*a* is long in the device width direction (the X-direction or the finger width direction). In such a case, the image capturing unit 5*a* (the camera 51 of the image capturing unit 5*a*) also needs to be moved in the device width direction (the X-direction or the finger width direction) when capturing images of the fingers U arranged on the finger stage 4*a*. The cutting plotter unit 7*a* needs to be moved freely in the X-direction when cutting the tape member S.

In this respect, the image capturing unit 5*a* and the cutting plotter unit 7*a* are coupled with the coupling frame 91 to constitute the integrated movable body 9. Thus, the mover (in particular, the drive motor 82 which is a driving source) in the X-direction is used in common, which simplifies the device configuration, reduces the number of components, and achieves weight reduction of the device as compared with the case of providing movers separately.

The finger stage 4*a* of the present embodiment allows the plurality of fingers U to be arranged next to each other in the finger width direction. The movable body 9 in which the image capturing unit 5*a* and the cutting plotter unit 7*a* are coupled to each other is movable by means of the mover (that is, the shaft 81, the drive motor 82 and the pulley 83, the driven pulley 84, and the timing belt 85) in the array direction of the fingers U arranged on the finger stage 4*a*.

In the present embodiment, the image capturing unit 5*a* needs to be moved in the array direction of the fingers U for capturing images of the plurality of fingers U arranged on the finger stage 4*a*. The array direction of the fingers U in the present embodiment is the finger width direction (that is, the device width direction or the X-direction). This is the same as the direction of movement of the cutting plotter unit 7*a* that needs to be moved in the X-direction when cutting the tape member S, and the mover (in particular, the drive motor 82 which is the driving source) is used in common for the image capturing unit 5*a* and the cutting plotter unit 7*a*.

This simplifies the device configuration, reduces the number of components, and achieves weight reduction of the device as compared with the case of providing movers separately.

Although the embodiments of the present invention have been described above, it goes without saying that the present invention is not limited to such embodiments, and may be variously modified within a range not departing from the spirit of the present invention.

For example, the cutting device may be provided with any display, indicator, and the like in addition to the power switch 21 and the operation input interface 22.

In the case where the cutting device includes a display and an indicator, guidance for various operations, procedures, and the like may be presented to the user on the display and indicator or the like. Besides the display and the like, the cutting device may include a sound outputter such as a speaker to enable guidance by sound or the like as appropriate.

In the case where the cutting device is provided with the display, an imaginary image or the like showing an adjustment result as to how to arrange a pattern that the user desires may be displayed on the display before performing the cutting operation on the tape member S for user confirmation.

The user may be able to correct the position, size, orientation, and the like of the pattern on the screen of the display. This configuration enables the masking tape Sc in which the cutout C2 closer to user's requests has been formed to be produced.

Although each of the above-described embodiments has illustrated an example in which the cutting device is implemented alone, the cutting device is not limited to the one used alone.

For example, the cutting device may perform the cutting processing in cooperation with any terminal device (such as a mobile terminal such as a smartphone or a tablet terminal, or a desktop PC, for example).

In this case, rather than the controller 11 of the cutting device, a controller of a terminal device that cooperates with the cutting device may function as the information acquirer that acquires information on the outer shape of the finger U and information on the region of the nail T from a finger image, for example. Similarly, the controller of the terminal device may function as the pattern receiver that receives information on a desired pattern and the adjuster that adjusts the pattern to be located within the region of the nail T based on the information on the outer shape of the finger U and the information on the region of the nail T acquired by the information acquirer.

In the case where the controller of the terminal device bear these functions, the controller 11 of the cutting device operates the image capturing unit 5 to capture a finger image, and provides the finger image for the terminal device side. The controller 11 functions as the cutting controller that is provided with an adjustment result obtained from the terminal device as the adjuster, and based on this adjustment result, operates the cutting plotter unit 7 serving as the cutter to produce the masking tape Sc in which a pattern has been cut out in a region corresponding to the region of the nail T. This configuration reduces the roles to be played by the controller 11 and the memory 12, thus simplifying the control device of the cutting device.

Further, in the case where the cutting device is capable of cooperating with the terminal device, various operations, displays, and the like may be performed through an operation input interface, a display, and the like of the terminal device without providing the cutting device with the operation input interface 22, the display, and the like.

The second embodiment has illustrated an example in which finger images are first acquired for all the fingers U or the like of the one hand H, for example, and thereafter the masking tape Sc is produced for the fingers U one by one, however, the procedure of producing the masking tape Sc is not limited to this.

For example, an image of one of the fingers U arranged on the finger stage 4*a* may be captured and the masking tape Sc to be attached to the finger U may be produced, and processing may be repeated similarly for each of the second and third fingers U.

In each of the above-described embodiments, a plurality of types of tape setting stages 62 may be prepared in advance in accordance with the types (sizes) of the tape members S. In this case, the tape setting stages 62 are removable from the base 61, and are replaceable in accordance with the type (such as size) of the tape member S to be set.

In this case, a list of the tape setting stages 62 which are selectable is displayed beforehand on the operation interface 25 of the terminal device 20, the operation input interface 22 of the cutting device, or the like, for example, and the user selects any of the tape setting stages 62 on the list. Information on the type of the tape setting stage 62 to be used in the cutting operation is thereby set. The user then sets the tape setting stage 62 selected from the list on the base 61.

This enables the cutting operation to be performed using the tape setting stage 62 suited for the type (such as size) of the tape member S on which cutting is to be performed. Through the use of the tape setting stage 62 suited for the type (such as size) of the tape member S, both side ends of the tape member S, for example, are caused to abut against the edges 622 without leaving any gap, which makes it unlikely to cause displacement or the like during cutting.

In the case where the tape setting stage 62 is replaceable, the tape setting stage 62 to be used for the cutting operation is not limited to one selected by the user beforehand.

For example, the device may guide the user to a suitable one of the tape members S in accordance with the outer shape of the finger U acquired from a finger image. This enables the user to easily select the tape setting stage 62 and the tape member S to be set thereon even in a case where he/she is unable to determine the type (such as size) of the tape member S for producing the masking tape Sc that matches the finger U of his/her own.

Specifically, in a case where the outer shape of the finger U acquired from a finger image is a thin finger such as the little finger, for example, the "S" size is recommended for the tape member S on which the cutting operation is to be performed next, and a display or the like is provided on the display 26 of the terminal device 20 or the operation input interface 22 of the cutting device to prompt the user to put the tape setting stage 62 for the "S" size to the base 61 accordingly.

The size guided by the device to the user may not be one. For example, the tape member S for the "M" size or a larger size may be recommended, and the user may be prompted to put the tape setting stage 62 for the "M" size or a larger size to the base 61.

The user is unable to attach the masking tape Sc well in a case where it is thinner (smaller) than the finger U to which the masking tape Sc is to be attached. However, in a case where the masking tape Sc is thicker (larger) than the size of the finger U, an action such as producing the mask base Sb by cutting such as cutting off both the right and left ends of the tape member S is taken even though a slight waist occurs.

Although some embodiments of the present invention have been described above, the scope of the present invention is not limited to the above-described embodiments, and includes the scope of the invention recited in the claims and the scope equivalent thereto.

The invention claimed is:

1. A cutting device comprising:
a cutting blade;
a tape setting stage on which a tape member is to be mounted; and
at least one processor,
wherein
in producing a masking tape by cutting out a pattern selected by a user from the tape member mounted on the tape setting stage with the cutting blade,
the at least one processor
detects a region of a nail based on an image of a fingertip acquired with a camera, and
adjusts a position at which the pattern is to be cut out such that the pattern is located within a region to be applied to the region of the nail having been detected.

2. The cutting device according to claim 1, wherein the at least one processor
detects an outer shape of a finger together with the region of the nail based on the image of the fingertip acquired with the camera, and
cuts off the masking tape from the tape member mounted on the tape setting stage with the cutting blade such that an outer shape of the masking tape becomes a shape corresponding to the outer shape of the finger having been detected.

3. The cutting device according to claim 1, wherein in adjusting the position at which the pattern is to be cut out, the at least one processor adjusts at least any of a position, an orientation, and a size of the pattern.

4. The cutting device according to claim 1, wherein in adjusting the position at which the pattern is to be cut out, the at least one processor adjusts the position at which the pattern is to be cut out such that the pattern is not located out of the region to be applied to the region of the nail having been detected.

5. The cutting device according to claim 1, further comprising:
a finger stage on which the fingertip is to be arranged to acquire the image of the fingertip with the camera; and
a partition that isolates the finger stage from a space in which the cutting blade is provided.

6. The cutting device according to claim 1, further comprising:
a finger stage on which the fingertip is to be arranged to acquire the image of the fingertip with the camera; and
a rest to rest a finger different from a finger for which the fingertip is to be arranged on the finger stage.

7. The cutting device according to claim 1, wherein the camera and the cutting blade are moved integrally.

8. A cutting method to be executed by a computer of a cutting device, the method comprising:
producing that is producing a masking tape by cutting out a pattern selected by a user from a tape member mounted on a tape setting stage with a cutting blade,
wherein the producing includes
detecting that is detecting a region of a nail based on an image of a fingertip acquired with a camera, and
adjusting that is adjusting a position at which the pattern is to be cut out such that the pattern is located within a region to be applied to the region of the nail having been detected in the detecting.

9. The cutting method according to claim 8,
wherein in the detecting, an outer shape of a finger is detected together with the region of the nail based on the image of the fingertip acquired with the camera, and
wherein the producing includes cutting off that is cutting off the masking tape from the tape member mounted on the tape setting stage with the cutting blade such that an outer shape of the masking tape becomes a shape corresponding to the outer shape of the finger having been detected.

10. The cutting method according to claim 8, wherein in the adjusting that is adjusting the position at which the pattern is to be cut out, at least any of a position, an orientation, and a size of the pattern is adjusted.

11. The cutting method according to claim 8, wherein in the adjusting that is adjusting the position at which the pattern is to be cut out, the position at which the pattern is to be cut out is adjusted such that the pattern is not located out of the region to be applied to the region of the nail having been detected.

12. A non-transitory storage medium having stored thereon a program readable by a computer of a cutting device that includes a cutting blade and a tape setting stage on which a tape member is to be mounted, the program causing the computer to execute
producing that is producing a masking tape by cutting out a pattern selected by a user from the tape member mounted on the tape setting stage with the cutting blade,
wherein the producing includes
detecting that is detecting a region of a nail based on an image of a fingertip acquired with a camera, and
adjusting that is adjusting a position at which the pattern is to be cut out such that the pattern is located within a region to be applied to the region of the nail having been detected in the detecting.

13. The storage medium according to claim 12,
wherein in the detecting, an outer shape of a finger is detected together with the region of the nail based on the image of the fingertip acquired with the camera, and
wherein the producing includes cutting off that is cutting off the masking tape from the tape member mounted on the tape setting stage with the cutting blade such that an outer shape of the masking tape becomes a shape corresponding to the outer shape of the finger having been detected.

14. The storage medium according to claim 12, wherein in the adjusting that is adjusting the position at which the pattern is to be cut out, at least any of a position, an orientation, and a size of the pattern is adjusted.

15. The storage medium according to claim 12, wherein in the adjusting that is adjusting the position at which the pattern is to be cut out, the position at which the pattern is to be cut out is adjusted such that the pattern is not located out of the region to be applied to the region of the nail having been detected.

* * * * *